(12) United States Patent
Zhang et al.

(10) Patent No.: US 11,359,036 B2
(45) Date of Patent: Jun. 14, 2022

(54) AMINE-BASED POLYMER, A PREPARATION PROCESS THEREOF AND USE THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Jianrong Zhang, Beijing (CN); Zuoxin Huang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 146 days.

(21) Appl. No.: 16/428,273

(22) Filed: May 31, 2019

(65) Prior Publication Data
US 2019/0367646 A1 Dec. 5, 2019

(30) Foreign Application Priority Data
May 31, 2018 (CN) .......................... 201810551975.1

(51) Int. Cl.
| | | |
|---|---|---|
| *C08F 110/10* | (2006.01) | |
| *C10L 1/236* | (2006.01) | |
| *C08F 8/32* | (2006.01) | |
| *C08F 8/46* | (2006.01) | |

(52) U.S. Cl.
CPC .............. *C08F 110/10* (2013.01); *C08F 8/32* (2013.01); *C08F 8/46* (2013.01); *C10L 1/236* (2013.01); *C08F 2810/40* (2013.01); *C10L 2200/0446* (2013.01); *C10L 2230/00* (2013.01); *C10L 2250/04* (2013.01); *C10L 2270/026* (2013.01)

(58) Field of Classification Search
USPC ............................... 525/333.7, 382; 508/232
See application file for complete search history.

(56) References Cited

U.S. PATENT DOCUMENTS 8,911,516 B2 * 12/2014 Grabarse ................. C10L 10/04
44/393
2013/0172220 A1 * 7/2013 Ruhe, Jr. .............. C10M 133/56
508/238
2014/0338253 A1 11/2014 Jung et al.
2016/0108331 A1 4/2016 Voelkel et al.
2019/0169514 A1 * 6/2019 Smith ................. C10M 149/10

FOREIGN PATENT DOCUMENTS

| CA | 2804322 A1 | 1/2012 |
| CN | 104736683 A | 6/2015 |
| CN | 105316049 A | 2/2016 |
| CN | 105555762 A | 5/2016 |
| CN | 107011952 A | 8/2017 |
| TW | 574370 B | 2/2004 |
| WO | 2006135881 A2 | 12/2006 |

OTHER PUBLICATIONS

Machine-generated translation of TW 574370, retrieved from Taiwan Intellectual Property Office (TIPO) on May 3, 2021, http://twpat.tipo.gov.tw/ (Year: 2004).*
Yuri Kim et al.; "Development of PIBSI type dispersants for carbon deposit from thermal oxidative decomposition of Jet A-1", FUEL, vol. 158, Oct. 1, 2015 (Oct. 1, 2015), pp. 91-97, XP055634851, GB ISSN: 0016-2361, DOI: 10.1016/j.fuel.2015.05.008.
XP002795247, retrieved from STN Database accession No. 2004:749658 & TW 574370 B Feb. 1, 2004—Chinese Petroleum Corp [TW]; Database CA [online] Chemical Abstracts Service, Columbus, Ohio, US.

* cited by examiner

*Primary Examiner* — Fred M Teskin
(74) *Attorney, Agent, or Firm* — Novick, Kim & Lee, PLLC; Allen Xue

(57) ABSTRACT

The present invention provides an amine-based polymer, a preparation process thereof and use thereof. The amine-based polymer of the present invention is characterized in that said amine-based polymer contains a polymer main chain, and a structure represented by formula (I) is attached onto the polymer main chain, and said structure is attached to the polymer main chain via an attaching end present in at least one of Group G, Group G' and Group A in the structure,

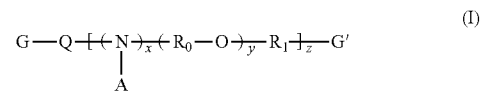

wherein each of the groups is defined as in the description. The amine-based polymer of the present invention is suitably used as a detergent, particularly suitably used as a fuel detergent. The amine-based polymer of the present invention is useful as a fuel detergent, and has an extraordinarily excellent detergency and dispersion properties.

18 Claims, 1 Drawing Sheet

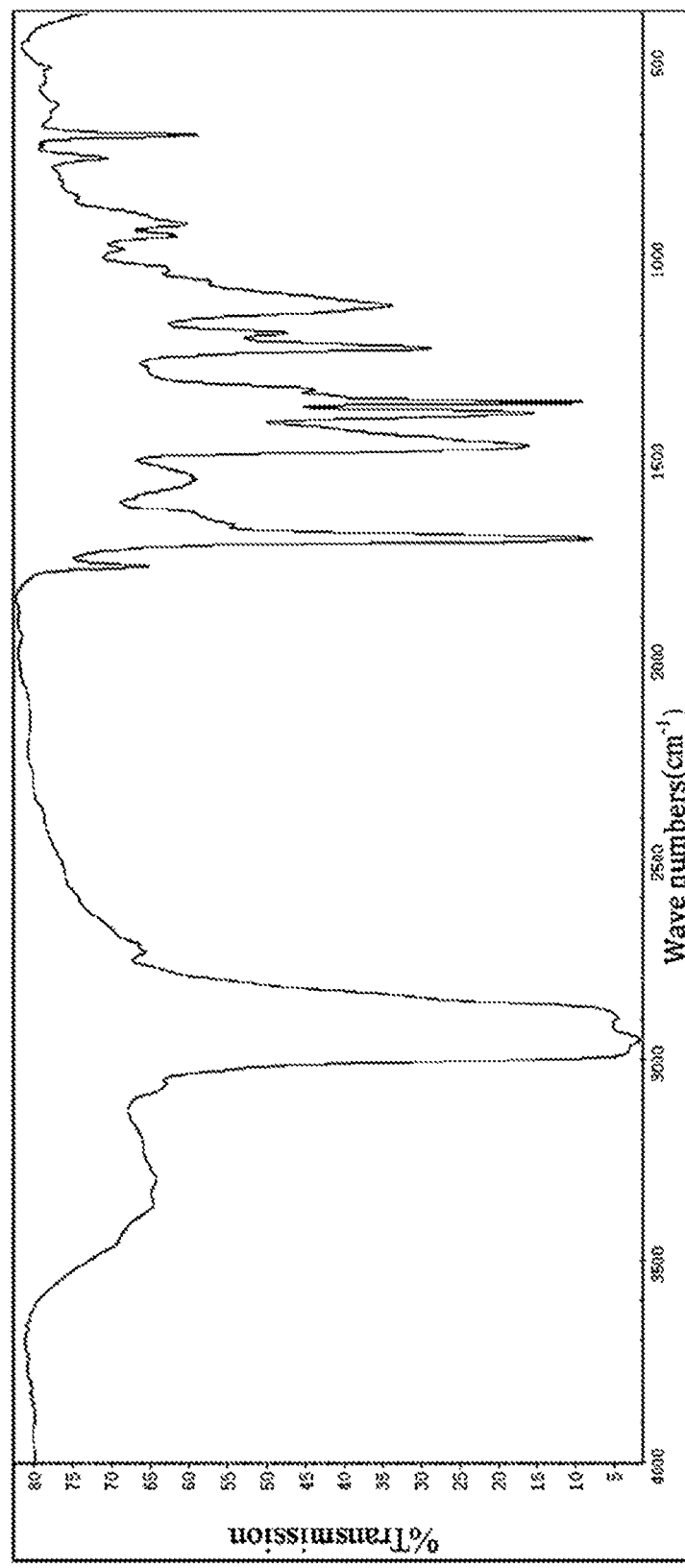

AMINE-BASED POLYMER, A PREPARATION PROCESS THEREOF AND USE THEREOF

TECHNICAL FIELD

The present invention relates to an amine-based polymer, in particular to an amine-based polymer useful as detergent. The present invention also relates to a process for preparing the amine-based polymer and the use thereof.

BACKGROUND TECHNOLOGY

It is well known that some components of liquid fuels could form carbon deposits during working of the internal combustion engine, which can result in reduced efficiency, exacerbated emissions, and reduced fuel economy of the internal combustion engine. In order to avoid this, it is usually necessary to add a fuel detergent to the liquid fuel, and the fuel detergent exerts the dispersion in the liquid fuel to suppress the formation of deposits (carbon deposits).

At present, the development of diesel detergent has become an integral part of the development and application of diesel engines. On the one hand, with the advancement of internal combustion engine technology, advanced internal combustion engine technology puts higher requirements on diesel detergent. For example, in the high pressure common rail technology of diesel engine, the working pressure of diesel injection system can be as high as 2000 bar. The working temperature at the diesel nozzle is up to 250-350° C. This rigorous temperature and pressure accelerate the degradation of diesel fuel, thus increasing the tendency to form carbon deposits. On the other hand, since the diesel fuel itself has a long carbon chain structure, oxidative decomposition is likely to occur at a higher temperature to form carbon deposits. Therefore, the development of diesel detergents is particularly important.

As one of the fuel additives, diesel detergent is essentially a polymer surfactant molecule comprising a polar group and a non-polar group. Its polar group can be adsorbed on the deposit molecules and/or the metal surface. The non-polar group improves the oil solubility, and prevents the deposit molecules from clustering and depositing on the metal parts, thereby providing the dispersing of deposits and detergency of fuel effect.

US20140338253 discloses detergent prepared by the reaction of polyethene polyamine with polyisobutylene succinic anhydride can effectively reduce the formation of engine deposits.

US20160108331 discloses an alkylamide betaine-type detergent, which uses chloroacetic acid as a quaternizing agent and exhibits good detergency performance in the DW10 engine bench test.

However, the detergent of the prior art still has a problem that the detergency and dispersion properties are not sufficiently satisfactory. Therefore, there is an urgent requirement for a detergent that can provide more excellent detergency and dispersion properties, whereby the fuel economy of the internal combustion engine can be further improved.

SUMMARY OF THE INVENTION

Based on the above problems, the inventors of the present invention have intensively studied and found that an amine-based polymer having a specific structure can achieve excellent detergency and dispersing properties when used as fuel detergent, thereby solving the technical problem of the present invention and accomplishing the present invention.

Accordingly, the present invention provides an amine-based polymer, a preparation process thereof and use thereof.

Specifically, the present invention provides an amine-based polymer, which is characterized in that said amine-based polymer contains a polymer main chain, and a structure represented by formula (I) is attached onto the polymer main chain, and said structure is attached to the polymer main chain via an attaching end present in at least one of Group G, Group G' and Group A in the structure,

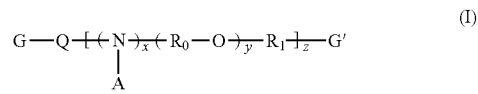

wherein, Group G and Group G' are each independently selected from

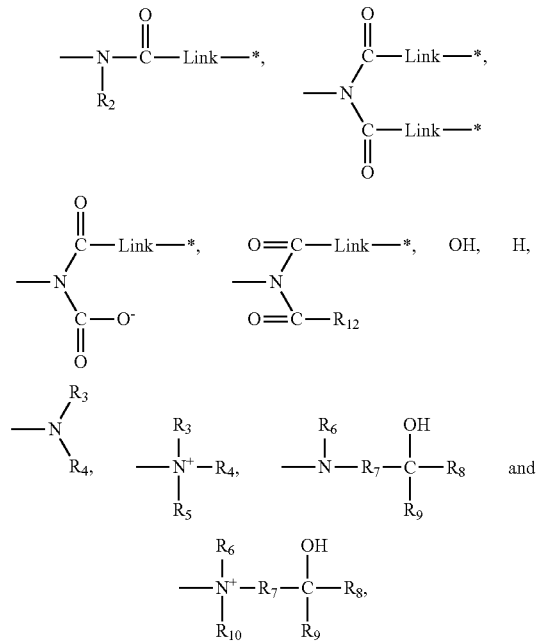

at least one of G and G' is selected from

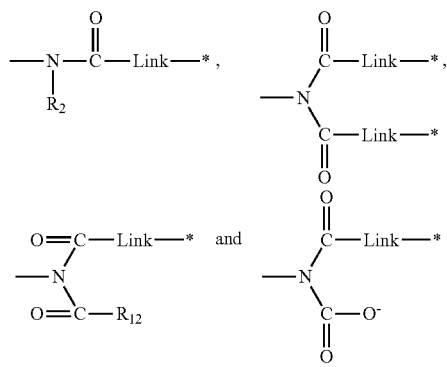

(preferably selected from

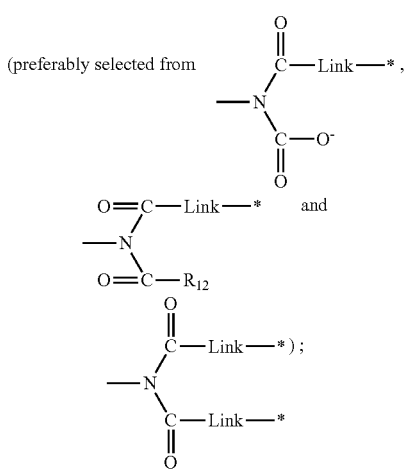

and each Group A present in formula (I) is each independently selected from H, $R_{11}$,

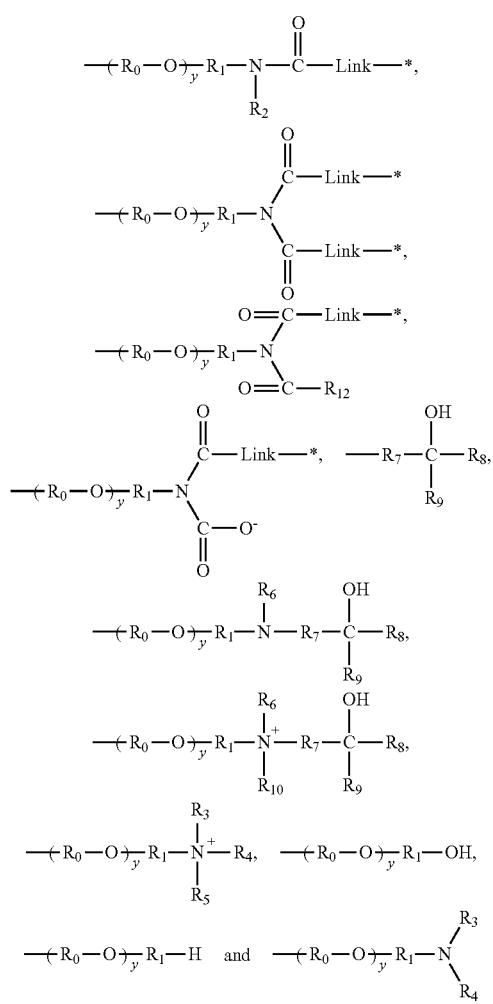

(preferably selected from H and $R_{11}$); the group Link represents a linking group, which is selected from a single bond and $C_1$-$C_{10}$ linear or branched hydrocarbylene (preferably $C_1$-$C_6$ linear or branched alkylene, further preferably $C_1$-$C_4$ linear or branched alkylene); * represents an attaching end for attaching to the polymer main chain, wherein two Link groups in each of the group

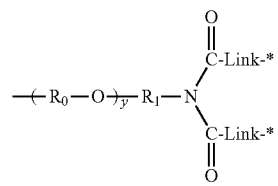

and the group

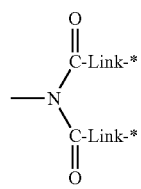

can be combined each other so that the group itself has one attaching end represented as *

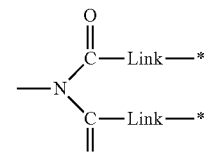

(preferably the moiety 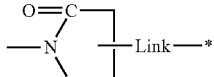 converts to the moiety

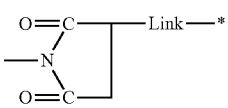, wherein m represents an integer of 1-5

(preferably an integer of 1-3, more preferably 1 or 2), more preferably

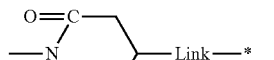

converts to at least one of

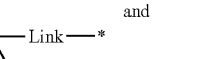

and

);

Q represents a single bond, $+(R_0-O)_y R_1-$ $C_1$-$C_{10}$ linear or branched hydrocarbylene (preferably $C_1$-$C_6$ linear or branched alkylene, further preferably $C_1$-$C_4$ linear or branched alkylene); each x in formula (I) is each independently 0 or 1; each y in formula (I) is each independently a positive integer (preferably an integer of 1-10, more preferably an integer of 1-3); z is 0 or a positive integer (preferably an integer of 1-10, more preferably an integer of 1-3), when z is 0, Q does not represent a single bond; each $R_0$ and each $R_1$ in formula (I) are each independently selected from $C_1$-$C_{10}$ linear or branched alkylene (preferably $C_1$-$C_5$ linear or branched alkylene, more preferably methylene, ethylene and propylene); each $R_2$, each $R_3$, each $R_4$, each $R_5$ and each $R_6$ present in formula (I) are each independently selected from H and $C_1$-$C_{10}$ linear or branched alkyl (preferably $C_1$-$C_5$ linear or branched alkyl, more preferably $C_1$-$C_3$ linear or branched alkyl); each $R_7$ present in formula (I) is each independently selected from $C_1$-$C_{10}$ linear or branched alkylene (preferably $C_1$-$C_5$ linear or branched alkylene, more preferably $C_1$-$C_3$ linear or branched alkylene) and $C_7$-$C_{16}$ aralkylene (preferably $C_7$-$C_{10}$ phenylalkylene); each $R_8$ and each $R_9$ present in formula (I) are each independently selected from H, $C_1$-$C_{10}$ linear or branched alkyl (preferably $C_1$-$C_5$ linear or branched alkyl, more preferably $C_1$-$C_3$ linear or branched alkyl), $C_6$-$C_{16}$ aryl (preferably $C_6$-$C_{10}$ aryl) and $C_7$-$C_{16}$ alkylaryl (preferably $C_7$-$C_{10}$ alkylphenyl); each $R_{10}$ and each $R_{11}$ present in formula (I) are each independently selected from H and $C_1$-$C_{10}$ linear or branched alkyl (preferably $C_1$-$C_5$ linear or branched alkyl, more preferably $C_1$-$C_3$ linear or branched alkyl), each Rig present in formula (I) is each independently selected from OH, halogen (preferably fluorine and chlorine), $C_1$-$C_{10}$ linear or branched alkyloxy (preferably $C_1$-$C_5$ linear or branched alkyloxy, more preferably $C_1$-$C_3$ linear or branched alkyloxy).

In formula (I), preferably, z is not 0, in z repeating units, when x in the terminal repeating unit attached to G-Q- is 0, Q is a single bond; when x in the terminal repeating unit attached to G-Q- is 1, Q is $-(R_0-O-)_y R_1-$, wherein the attaching end at the $R_0$ side is attached to G, the attaching end at the $R_1$ side is attached to the nitrogen atom in the terminal repeating unit

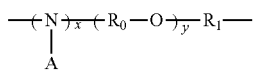

attached to G-Q- in z repeating units.

In formula (I), when z is 0, Q represents $-(R_0-O-)_y R_1-$ or $C_1$-$C_{10}$ linear or branched hydrocarbylene, preferably $C_1$-$C_{10}$ linear or branched hydrocarbylene, more preferably $C_1$-$C_6$ linear or branched alkylene, further preferably $C_1$-$C_4$ linear or branched alkylene.

In formula (I), when z is 1, that is to say, when there is only one repeating unit

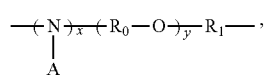

the structure represented by formula (I) is

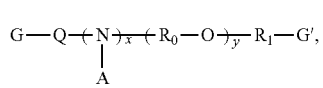

at this time, when x is 0, Q is a single bond, then the structure represented by formula (I) is G-$(R_0$—O-$)_y R_1$-G'; when x is 1, Q is $-(R_0$—O-$)_y R_1-$, then the structure represented by formula (I) is

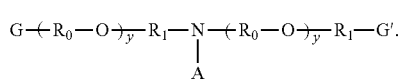

In formula (I), when z is greater than 1, that is to say, there are z repeating units

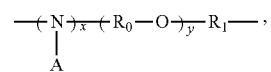

the structure represented by formula (I) is

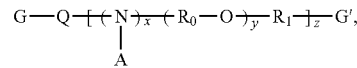

that is

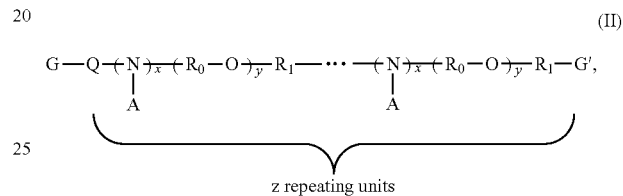

(II)

the omission symbol * * * therein represents the middle z repeating units

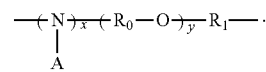

At this time, when x in the terminal repeating unit attached to G-Q- (x in the left side of formula (II)) is 0, Q is a single bond, that is to say, G is directly attached to $R_0$ in the terminal repeating unit; when x in the terminal repeating unit attached to G-Q- (x in the left side of formula (II)) is 1, Q is $-(R_0-O-)_y R_1-$, in said Q, the attaching end at the $R_0$ side is attached to G, and the attaching end at the $R_1$ side is attached to the nitrogen atom in the terminal repeating unit in z repeating units.

In formula (I), for Group G and Group G', sometimes they could be selected from the groups having positive or negative charge(s) such as

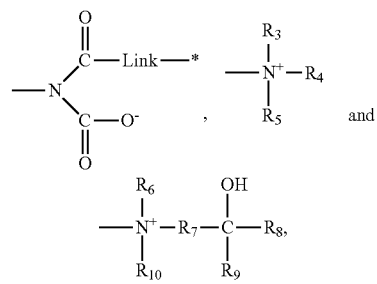

for Group A (possibly one or more, or also possible zero), sometimes it could be selected from the groups having positive or negative charge(s) such as

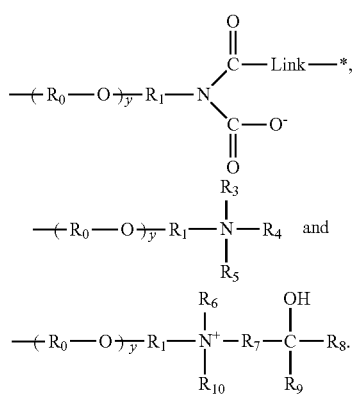

When Group G, Group G' and Group A in formula (I) are selected from the groups having positive or negative charge(s), it is possible that the sum of the charges carried by Group G, Group G' and Group A in formula (I) is 0, that is to say, an inner salt is formed in the amine-based polymer molecule. It is also possible that the sum of the charge numbers of the charged amine-based polymer ions and the counter ions is 0, that is to say, the charged amine-based polymer ions and the counter ions form a salt. In summary, the sum of the number of charges carried by the amine-based polymer molecule as a whole is zero, that is to say, the amine-based polymer as a whole is an electrically neutral molecule.

Preferably, in case that Group G, Group G' and Group A are selected from the charged groups, the sum of the charges carried by Group G, Group G' and Group A in formula (I) is 0, that is to say, an inner salt is formed in the amine-based polymer molecule. That is to say, when Group G and Group G' in formula (I) are each independently selected from

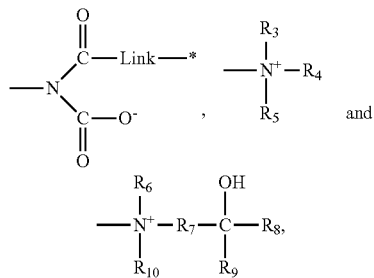

and/or each Group A present in formula (I) is each independently selected from

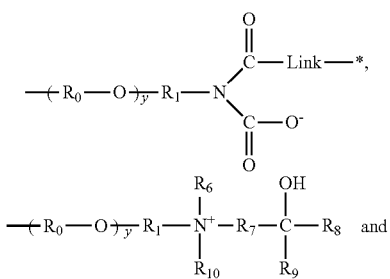

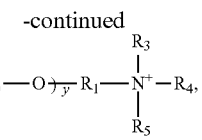

the sum of the numbers of the charges of Group G, Group G' and Group A in formula (I) is 0.

According to the present invention, the parent polymer main chain of the amine-based polymer (herein, sometimes simply referred to as the polymer main chain) means a polymeric polymer backbone as the main chain backbone, except the above structure represented by the above formula (I). The parent polymer main chain of said amine-based polymer is preferably at least one polymer selected from polyolefin, polyester and polyether, further preferably polyolefin, including but not limited to homopolymer or copolymer of $C_{2-20}$ olefin, more preferably homopolymer or copolymer of $C_{2-10}$ olefin.

Further, the polymer main chain also means a polymeric polymer backbone except organic functional group(s), in the case that the organic functional group(s) is attached on the polymer chain. For example, in the case that the polymer is after said polymer comprising the —$COR_{13}$ group and/or the

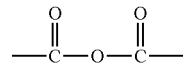

group attached onto the polymer main chain, the polymer main chain means the polymeric polymer backbone except the —$COR_{13}$ group and/or the

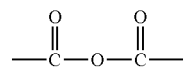

group attached on the polymer. Further, the polymer main chain also means a polymeric polymer backbone except organic functional group(s) containing C=C bond(s) therein, in the polymer containing C=C and said C=C is contained in organic functional group(s). In other words, in the case that the polymer contains C=C bond(s), and said C=C bond(s) exist in the polymer main chain, the polymeric polymer backbone containing C=C bond(s) is regarded as the polymer main chain (polymer itself).

The polymer main chain, may be at least one selected from polyolefin, polyester and polyether, preferably polyolefin, more preferably homopolymer or copolymer of $C_{2-10}$ olefin. As the polymer main chain, for example polyethylene, polypropylene, polybutylene, polyisobutylene, polypentene, polyhexylene, polyoctylene, polynonylene, polydecylene and the like can be exemplified, but its example is not limited thereto. The polymer main chain has a number-average molecular weight of 500-5000, preferably 500-2500, further preferably 500-1300.

According to the present invention, the structure represented by formula (I) is attached to the polymer main chain via an attaching end present in at least one of Group G, Group G' and Group A in the structure. In this situation, the structure represented by formula (I) may be attached to the polymer main chain via one or more attaching ends.

According to the present invention, the structure represented by formula (I) can be attached to the polymer main chain via an attaching end present in any of Group G, Group G' and Group A. In this situation, the structure represented by formula (I) may be attached to the polymer main chain via one attaching end.

According to the present invention, the polymer main chain of the amine-based polymer can be attached to an attaching end present in at least one of Group G, Group G' and Group A in the structure represented by formula (I) via the —C— bond and/or the —O— bond. Preferably, the carbon atom of the —C— bond and/or the oxygen atom of the —O— bond locate on the main chain skeleton.

According to the present invention, "the structure represented by formula (I) is attached to the polymer main chain" refers to, including the situation of more than one structures represented by formula (I) being attached to one polymer main chain, and also including the situation of one structure represented by formula (I) being attached to more than one polymer main chains.

In other words, the amine-based polymer of the present invention includes the situation of one or more structures represented by formula (I) (preferably one structure represented by formula (I)) being attached to one polymer main chain, and also includes the situation of one or more polymer main chains (preferably one or two polymer main chains) being attached to one structure represented by formula (I).

Among those, when one or more structures represented by formula (I) are attached to one polymer main chain of the amine-based polymer, that is to say, one or more structures represented by formula (I) as pendant groups are attached to one polymer main chain of the amine-based polymer, these pendant groups are independently present with each other, and the definitions of each group and each symbol in these pendant groups can be identical to or different from each other for different pendant groups/within the same pendant group. In this situation, these structures represented by formula (I) as pendant groups are each independently attached to the polymer main chain via attaching ends present in at least one of Group G, Group G' and Group A in each structure.

In addition, when one structure represented by formula (I) is attached to one or more polymer main chains, that is to say, said one structure represented by formula (I) is attached to one or more polymer main chains, these polymer main chains are mutually independent to each other, and these polymer main chain can be each independently selected from those mentioned above as the polymer main chain. In this situation, the structure represented by formula (I) is attached to these polymer main chains via attaching ends present in at least one of Group G, Group G' and Group A of the structure represented by formula (I).

According to the present invention, the amine-based polymer can be a single polymer that is the polymer having the structure represented by formula (I), and can also be a mixture containing the polymer having the structure represented by formula (I). As one form of "a mixture containing the polymer having the structure represented by formula (I)", it refers to that each polymer contains the polymer main chain and has the structure represented by formula (I), but it is a mixture of two or more polymers, wherein the structure, the polymerization degree and/or the type of the main chain in each polymer are different from each other. As another form of "a mixture containing the polymer having the structure represented by formula (I)", it refers to that each polymer contains the polymer main chain and has the structure represented by formula (I), but it is a mixture of two or more polymers, wherein the structure represented by formula (I) attached in each polymer is different from each other.

As a mixture of the amine-based polymers of the present invention, it is not limited to the above two forms, provided that a polymer contains the polymer main chain and has the structure represented by formula (I) attached to the polymer main chain, it is the amine-based polymer of the present invention. Usually, the amine-based polymer of the present invention is a mixture containing the polymer in which the structure represented by formula (I) is attached to the polymer main chain.

According to the present invention, there also provides a process for preparing the amine-based polymer, which comprising an acylation reaction step of a polymer comprising the —COR$_{13}$ group and/or the

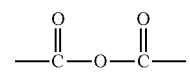

group attached onto the polymer main chain with the compound represented by formula (III),

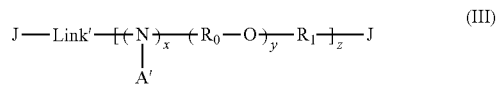

each x in the compound represented by formula (III) is each independently 0 or 1; each y in the compound represented by formula (III) is each independently a positive integer (preferably an integer of 1-10, more preferably an integer of 1-3); z is 0 or a positive integer (preferably an integer of 1-10, more preferably an integer of 1-3); each J is each independently selected from OH, H,

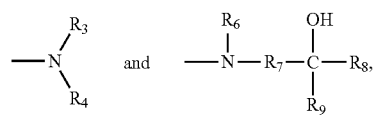

and among others at least one J is selected from

each A' in formula (III) is each independently selected from H, R$_{11}$,

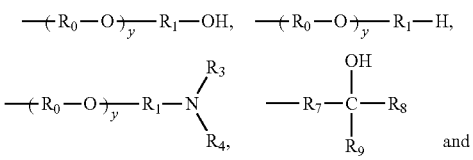

and

-continued

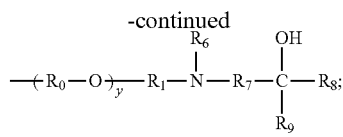

in the formula (III), each $R_0$ and each $R_1$ are each independently selected from $C_1$-$C_{10}$ linear or branched alkylene (preferably $C_1$-$C_5$ linear or branched alkylene, more preferably methylene, ethylene and propylene); each $R_3$, each $R_4$, each $R_6$ are each independently selected from H and $C_1$-$C_{10}$ linear or branched alkyl (preferably $C_1$-$C_5$ linear or branched alkyl, more preferably $C_1$-$C_3$ linear or branched alkyl); each $R_7$ is each independently selected from $C_1$-$C_{10}$ linear or branched alkylene (preferably $C_1$-$C_5$ linear or branched alkylene, more preferably $C_1$-$C_3$ linear or branched alkylene) and $C_7$-$C_{16}$ aralkylene (preferably $C_7$-$C_{10}$ phenylalkylene); each $R_8$ and each $R_9$ are each independently selected from H, $C_1$-$C_{10}$ linear or branched alkyl (preferably $C_1$-$C_5$ linear or branched alkyl, more preferably $C_1$-$C_3$ linear or branched alkyl), $C_6$-$C_{16}$ aryl (preferably $C_6$-$C_{10}$ aryl) and $C_7$-$C_{16}$ alkylaryl (preferably $C_7$-$C_{10}$ alkylphenyl); each $R_{11}$ is each independently selected from H and $C_1$-$C_{10}$ linear or branched alkyl (preferably $C_1$-$C_5$ linear or branched alkyl, more preferably $C_1$-$C_3$ linear or branched alkyl), $R_{13}$ is selected from OH, a halogen atom (preferably fluorine or chlorine), $C_1$-$C_{10}$ linear or branched alkyloxy (preferably $C_1$-$C_5$ linear or branched alkyloxy, more preferably $C_1$-$C_3$ linear or branched alkyloxy); the group Link' represents a linking group, and is selected from a single bond, $-\!(R_0\!-\!O)_y\!R_1\!-$ and $C_1$-$C_{10}$ linear or branched hydrocarbylene (preferably $C_1$-$C_6$ linear or branched alkylene, further preferably $C_1$-$C_4$ linear or branched alkylene), when z is 0, the group Link' does not represent a single bond.

In formula (III), preferably, z is not 0, in z repeating units, when x in the terminal repeating unit attached to J-Link' is 0, Link' is a single bond; when x in the terminal repeating unit attached to J-Link' is 1, Link' is $-\!(R_0\!-\!O)_y\!R_1\!-$ or $C_1$-$C_{10}$ linear or branched hydrocarbylene, wherein, when Link' is $-\!(R_0\!-\!O)_y\!R_1\!-$, the attaching end at the $R_0$ side is attached to J, the attaching end at the $R_1$ side is attached to the N atom of the terminal repeating unit

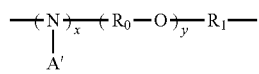

attached to J-Link' in z repeating units.

Preferably, the compound represented by formula (III) can be the following compound represented by formula (III'),

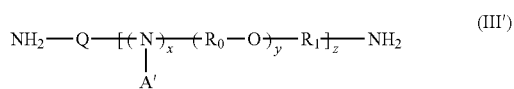 (III')

wherein A' is each independently selected from H, $R_{11}$

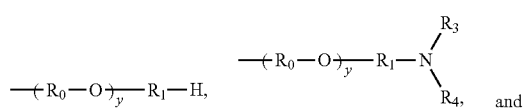

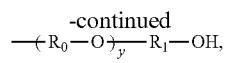

z is a positive integer (preferably an integer of 1-10, more preferably an integer of 1-3); in z repeating units, when x in the terminal repeating unit attached to $NH_2$-Q- is 0, Q is a single bond; when x in the terminal repeating unit attached to $NH_2$-Q- is 1, Q is $-\!(R_0\!-\!O)_y\!R_1\!-$.

Preferably, the compound represented by formula (III) can also be

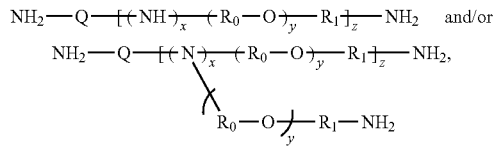

wherein x is 1, z is a positive integer (preferably an integer of 1-10, more preferably an integer of 1-3), Q is $-\!(R_0\!-\!O)_y\!R_1\!-$.

According to the present invention, as a specific example of the compound represented by formula (III), for example, 2-[2-(2-aminoethoxy)ethoxy]ethylamine, 3,6,9-trioxaundecane-1,11-diamine and N,N-dimethylpropanediamine can be exemplified.

According to the present invention, the reaction molar ratio of the polymer comprising the —$COR_{13}$ group and/or the

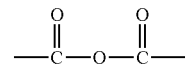

group attached onto the polymer main chain to the compound represented by formula (III) depends on the structure of the amine-based polymer to be prepared, that is to say, depends on the amount of the compound represented by formula (III) to be reacted with the amount of polymer, and is generally 1:0.1-10, preferably 1:0.5-5, more preferably 1:0.5-2, further preferably 1:0.9-1.1.

According to the present invention, the polymer comprising the —$COR_{13}$ group and/or the

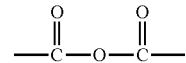

group attached onto the polymer main chain and the compound represented by formula (III) are reacted at a reaction temperature of 40° C.-180° C., preferably 40-150° C., more preferably 40-80° C.

According to the present invention, the polymer comprising the —$COR_{13}$ group and/or the

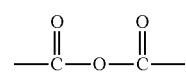

group attached onto the polymer main chain and the compound represented by formula (III) are reacted under a reaction pressure of 0.1-10 MPa, preferably 0.1-5 MPa.

According to the present invention, the polymer comprising the —COR$_{13}$ group and/or the

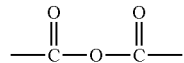

group attached onto the polymer main chain and the compound represented by formula (III) are reacted for a reaction period of 0.1 h-5 h, preferably 0.2 h-2 h, more preferably 0.2 h-1.5 h.

According to the present invention, in the reaction of the polymer comprising the —COR$_{13}$ group and/or the

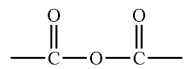

group attached onto the polymer main chain with the compound represented by formula (III), a solvent may be used, or a solvent may not be used. When a solvent is used, as the solvent, one or more of toluene, petroleum ether and base oil can be used, and petroleum ether is preferably used. The amount of the solvent may be a conventionally used amount, preferably from 10% to 200% by mass of the polymer comprising the —COR$_{13}$ group and/or the

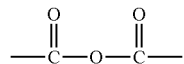

group attached onto the polymer main chain. The solvent can be removed after completion of the reaction by methods known to those skilled in the art.

According to the present invention, the polymer comprising the —COR$_{13}$ group and/or the

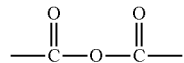

group attached onto the polymer main chain is preferably a polymer containing q groups of —COR$_{13}$ and/or

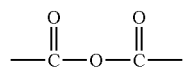

per the polymer molecule, wherein said q is the ratio of the total number of the —COR$_{13}$ group and/or the

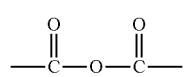

group in the polymer to the total number of the polymer molecule. Since it is an average, it can be a non-integer number. According to the present invention, q is in the following range: 1≤q≤10, preferably 1≤q≤5. The polymer main chain of said polymer containing q groups of —COR$_{13}$ and/or

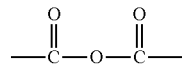

per the polymer molecule is preferably at least one selected from polyolefin, polyether and polyester (preferably polyolefin, more preferably homopolymer or copolymer of C$_{2-10}$ olefin). More specifically, as polymer main chain of the polymer containing q groups of —COR$_{13}$ and/or

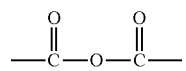

per the polymer molecule, polyethylene, polypropylene, polybutylene, polyisobutylene, polypentene, polyhexylene, polyoctylene, polynonylene, polydecylene and the like can be exemplified, but its example is not limited thereto.

According to the present invention, the polymer main chain of the polymer comprising the —COR$_{13}$ group and/or the

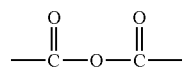

group attached onto the polymer main chain has a number-average molecular weight of 500-5000, preferably 500-2500, further preferably 500-1300.

According to the present invention, the polymer comprising the —COR$_{13}$ group and/or the

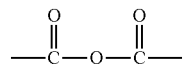

group attached onto the polymer main chain is preferably a product of the addition reaction of a polymer containing C═C bond(s) with an alkenyl acid and/or an alkenyl anhydride, more preferably a product of the addition reaction of a polymer containing u C═C bonds per the polymer molecule with an alkenyl acid and/or an alkenyl anhydride. Among others, said u is a ratio of the total number of C═C bonds in the polymer to the total number of the polymer molecule. Since it is an average, it can be a non-integer number. According to the present invention, u is in the following range: 1≤u≤10, more preferably 1≤u≤5.

According to the present invention, the polymer comprising the —COR$_{13}$ group and/or the

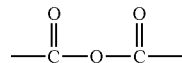

group attached onto the polymer main chain is further preferably a product of the addition reaction of a polymer containing u C═C bonds per the polymer molecule and being at least one selected from polyolefin, polyether and polyester with an alkenyl acid and/or an alkenyl anhydride.

According to the present invention, said polymer containing u C═C bonds per the polymer molecule is preferably polyolefin, more preferably homopolymer or copolymer of C$_{2-10}$ olefin. More specifically, as said polymeric part, polyethylene, polypropylene, polybutylene, polyisobutylene, polypentene, polyhexylene, polyoctylene, polynonylene, polydecylene and the like can be exemplified, but its example is not limited thereto.

According to the present invention, more preferably, said polymer containing C=C bond(s) is preferably a polymer containing 1-2 C=C bond(s) per the polymer molecule, more preferably a polyolefin containing 1-2 C=C bond(s) per the polymer molecule, more preferably a homopolymer or copolymer of $C_{2-10}$ olefin containing 1-2 C=C bond(s) per the polymer molecule, further preferably a homopolymer or copolymer of $C_{2-10}$ α-olefin containing 1-2 C=C bond(s) per the polymer molecule.

According to the present invention, said polyolefin containing 1-2 C=C bond(s) per the polymer molecule further can be one or more selected from polyethylene, polypropylene, polybutylene, polyisobutylene, polypentene, polyhexylene, polyoctylene, polynonylene and polydecylene. According to the present invention, said polymer containing the C=C bond(s) in the polymer molecule is preferably a poly-α-olefin containing more than one, preferably 1-2 —CH=CH$_2$ bond(s) per the polymer molecule obtained by polymerization of $C_{2-10}$ α-olefin, for example can be one or more selected from polyethylene, polypropylene, polybutylene, polyisobutylene, polypentene, polyhexylene, polyoctylene, polynonylene and polydecylene and containing more than 1, preferably 1-2 —C=CH$_2$ bond(s).

According to the present invention, the polymer main chain of the polymer containing C=C bond(s) has a number-average molecular weight of 500-5000, preferably 500-2500, further preferably 500-1300.

According to the present invention, said alkenyl acid and/or said alkenyl anhydride is preferably $C_3$-$C_{10}$ alkenyl acid and/or $C_4$-$C_{20}$ alkenyl anhydride containing at least one of C=C bond(s), more preferably $C_4$-$C_{10}$ alkenyl diacid and/or $C_4$-$C_{15}$ alkenyl diacid anhydride containing at least one of C=C bond(s). As the alkenyl acid and/or the alkenyl anhydride of the present invention, for example, one or more of acrylic acid, butenoic acid, pentenoic acid, hexenoic acid, heptenoic acid, octylenic acid, nonenoic acid, decylenic acid, butene diacid, pentene diacid, hexene diacid, heptylene diacid, octene diacid, nonene diacid, decylene diacid, acrylic anhydride, butenoic anhydride, maleic anhydride, butene diacid anhydride, pentene diacid anhydride, hexene diacid anhydride, heptylene diacid anhydride, octene diacid anhydride, nonene diacid anhydride and decylene diacid anhydride can be exemplified.

According to the present invention, the reaction molar ratio of the polymer containing C=C bond(s) to the alkenyl acid and/or the alkenyl anhydride depends on the amount of alkenyl acid and/or alkenyl anhydride to be added per polymer molecule, and based on the total molar number of the C=C bonds contained in the polymer, is generally 1:0.1-10, preferably 1:0.5-5, more preferably 1:0.9-1.1.

According to the present invention, the polymer containing C=C bond(s) and the alkenyl acid and/or the alkenyl anhydride are reacted at a reaction temperature of 100° C.-350° C., preferably 200° C.-300° C.

According to the present invention, the polymer containing C=C bond(s) and the alkenyl acid and/or the alkenyl anhydride are reacted under a reaction pressure of 0.1 MPa-10 MPa, preferably 0.1 MPa-5 MPa.

According to the present invention, the polymer containing C=C bond(s) and the alkenyl acid and/or the alkenyl anhydride are reacted for a reaction period of 0.1 h-10 h, preferably 0.5 h-10 h.

According to the present invention, in the reaction process of the reaction of the polymer containing C=C bond(s) and the alkenyl acid and/or the alkenyl anhydride, an inert gas is introduced, preferably nitrogen is introduced.

According to the present invention, in the reaction of the polymer containing C=C bond(s) with the alkenyl acid and/or the alkenyl anhydride, a solvent may be used, or a solvent may not be used. When a solvent is used, as the solvent, one or more of toluene, petroleum ether and base oil can be used, and petroleum ether is preferably used. The amount of the solvent may be a conventionally used amount, preferably from 10% to 200% by mass of the polymer containing C=C bond(s). The solvent can be removed after completion of the reaction by methods known to those skilled in the art.

According to the present invention, upon reacting the reaction product of the polymer containing C=C bond(s) and the alkenyl acid and/or alkenyl anhydride with the compound represented by formula (III), by controlling the reaction conditions, a polymer containing a imide group can be formed, and a polymer containing an amide group and a carboxylic acid group can also be formed.

According to the present invention, upon reacting the reaction product of the polymer containing C=C bond(s) and the alkenyl acid and/or alkenyl anhydride with the compound represented by formula (III), by controlling the reaction conditions, an amine-based polymer containing an amino group can be formed.

According to the present invention, said amine-based polymer can contain an amino group in the structure represented by formula (I). In this situation, said amine-based polymer containing an amino group can be further subjected to the quaterisation reaction with a quaternizing agent. The reaction product thus obtained is also included in the scope of protection of the present invention.

According to the present invention, the quaterisation reaction of said amine-based polymer containing an amino group can be carried out in the reaction conditions well known in the art. For example, the quaterisation reaction comprises: a step of reacting said amine-based polymer containing an amino group with a quaternizing agent. The quaternizing agent can be a quaternizing agent well known in the art, and can be selected from one or more of dialkyl sulfate ester, hydrocarbyl-substituted carbonate (preferably alkyl-substituted carbonate) and hydrocarbyl epoxide (preferably alkyl epoxide). As the quaternizing agent, for example, one or more of styrene oxide, propylene oxide, ethylene oxide, dimethyl carbonate and diethyl carbonate can be exemplified.

According to the present invention, the reaction molar ratio of said amine-based polymer containing an amino group to the quaternizing agent in the quaterisation reaction is 1:0.5-5, preferably 1:0.9-1.1; the reaction temperature of said quaterisation reaction is 50° C.-80° C., preferably 60° C.-70° C.; the reaction pressure of said quaterisation reaction is 0.1-10 MPa, preferably 0.1-5 MPa; the reaction time of said quaterisation reaction is 1 h-10 h, preferably 3 h-5 h; an inert gas (preferably nitrogen) is introduced in the quaterisation reaction process.

According to the present invention, after the completion of the preparation process of the amine-based polymer, the optionally added catalyst and/or solvent can be removed from the finally obtained reaction mixture with the method well known in the art to obtain the amine-based polymer.

The present invention also provides a composition comprising the amine-based polymer of the present invention.

The amine-based polymer of the present invention is suitable for use as detergents and is particularly suitable for use as fuel detergents.

The present invention also provides use of the amine-based polymer, the composition of the present invention as fuel detergent.

Effect of the Present Invention

When the amine-based polymer of the present invention is used as a fuel detergent, it exhibits excellent detergency and dispersing properties, whereby the fuel economy of the internal combustion engine can be further improved.

BRIEF DESCRIPTION OF THE DRAWINGS

The figure is an infrared spectrum of the polymer of Example 1, in which the secondary amide absorption peak is at 1547 $cm^{-1}$, the imide C=O peak is at 1709 $cm^{-1}$, and the C—O—C characteristic peak is at 1121 $cm^{-1}$.

DETAILED DESCRIPTION OF THE INVENTION

The specific embodiments of the present invention are described in detail below, but it should be noted that the scope of the present invention is not limited by the specific embodiments, but is determined by the appended claims.

All publications, patent applications, patents and other references mentioned in this specification are hereby incorporated by reference. Unless otherwise defined, all technical and scientific terms used in the specification have the meanings as conventionally understood by those skilled in the art. In case of conflict, the definition of this specification shall prevail.

When the present specification derives material, substance, method, step, device, component or the like with the expression such as "known to those skilled in the art", "known in the art", "prior art" or a synonym thereof, the object derived with said expression covers not only those conventionally used in the art at the time of filing the application, but also those that are not currently used but will become recognized in the art to be suitable for similar purposes.

In the context of the present specification, any items or matters not mentioned are directly applicable to those known in the art without any change other than those explicitly stated. Moreover, any embodiment described herein can be freely combined with one or more other embodiments described herein, and thus the resulting technical solution or technical concept is considered to be the part of the original disclosure or the original description of the present invention, and should not be considered as new content that has not been disclosed or contemplated herein, unless it is apparent to those skilled in the art that the combination is clearly unreasonable.

All of percentages, parts, ratios and the like referred to in this specification are based on the weight, unless the basis on the weight does not meet the conventional knowledge of those skilled in the art.

In practicing or testing the invention, methods and materials similar or equivalent to those described herein can be used, but applicable methods and materials have been described herein.

In the context of the present specification, the expression "halogen" refers to fluorine, chlorine, bromine or iodine.

In the present specification, the term "single bond" is sometimes used in the definition of a group. By "single bond" is meant that the group does not exist. For example, the structural formula —$CH_2$-A-$CH_3$ is assumed, wherein Group A is defined as being selected from a single bond and methyl. In view of this, if A is a single bond, it means that Group A does not exist, and the structural formula is correspondingly simplified to —$CH_2$—$CH_3$.

In the context of the present specification, the number average molecular weight Mn and the weight average molecular weight Mw are determined by gel permeation chromatography (GPC) unless otherwise specified.

In the context of the present specification, unless otherwise specified, the gel permeation chromatography is performed on Waters 1515-Gel Permeation Chromatograph (from Waters, USA), with a mobile phase of tetrafuran, a flow rate of 1 mL/min, a column temperature of 35 degrees Celsius, an elution time of 33 min, and a weight fraction of the sample of 0.1%.

In the context of the present specification, $C_1$-$C_{10}$ hydrocarbylene represents a group obtained by removing two hydrogen atoms, without violating the valence, from a hydrocarbon (alkane, alkene or alkyne) having 1 to 10 carbon atoms, preferably a group obtained by removing one hydrogen atom respectively from each of two different carbon atoms, more preferably a group obtained by removing one hydrogen atom respectively from each of two terminal-end carbon atoms of the hydrocarbon. As $C_1$-$C_{10}$ hydrocarbylene, $C_2$-$C_{10}$ linear or branched alkenylene and $C_2$-$C_{10}$ linear or branched alkynylene can be exemplified. As $C_1$-$C_{10}$ hydrocarbylene, it is preferably $C_1$-$C_{10}$ linear or branched alkylene, more preferably $C_1$-$C_6$ linear or branched alkylene, further more preferably $C_1$-$C_4$ linear or branched alkylene. For example, methylene, ethylene, propylene, butylene and the like can be exemplified, but it is not limited thereto.

In the context of the present specification, $C_1$-$C_{10}$ alkylene represents a group obtained by removing two hydrogen atoms, without violating the valence, from an alkane having 1 to 10 carbon atoms, preferably a group obtained by removing one hydrogen atom respectively from each of two different carbon atoms, more preferably a group obtained by removing one hydrogen atom respectively from each of two terminal-end carbon atoms of the alkane. As $C_1$-$C_{10}$ alkylene, it is preferably $C_1$-$C_5$ linear or branched alkylene, more preferably $C_1$-$C_4$ linear or branched alkylene, more preferably $C_1$-$C_3$ linear or branched alkylene. For example, methylene, ethylene, propylene, butylene and the like can be exemplified, but it is not limited thereto.

In the context of the present specification, $C_1$-$C_{10}$ alkyl represents a group obtained by removing one hydrogen atom, without violating the valence, from an alkane having 1 to 10 carbon atoms, preferably a group obtained by removing one hydrogen atom from one terminal-end carbon atom of the alkane. As $C_1$-$C_{10}$ alkyl, it is preferably $C_1$-$C_5$ linear or branched alkyl, more preferably $C_1$-$C_4$ linear or branched alkyl, more preferably $C_1$-$C_3$ linear or branched alkyl. For example, methyl, ethyl, propyl, iso-propyl, butyl, sec-butyl, tert-butyl, pentyl, iso-pentyl, hexyl, heptyl and the like can be exemplified, but it is not limited thereto.

In the context of the present specification, $C_7$-$C_{16}$ aralkylene represents a group obtained by removing two hydrogen atoms, without violating the valence, from an aryl alkane having a total carbon atom number of 7 to 16, preferably a group obtained by removing one hydrogen atom respectively from each of two different carbon atoms, more preferably a group obtained by removing one hydrogen atom respectively from each of two carbon atoms of the alkyl moiety of the aryl alkane. As $C_7$-$C_{16}$ aralkylene, it is preferably $C_7$-$C_{10}$ phenylalkylene. Among others, the alkyl moiety can be a linear or branched alkyl. For example, phenylene methyl, phenylene ethyl, phenylene propyl and the like can be exemplified, but it is not limited thereto.

In the context of the present specification, $C_6$-$C_{16}$ aryl represents a group obtained by removing one hydrogen atom from an aromatic hydrocarbon having the total carbon atom number of 6 to 16. As $C_6$-$C_{16}$ aryl, it is preferably $C_6$-$C_{10}$ aryl. For example, phenyl, biphenyl, naphthyl, fluorenyl, phenanthryl, anthryl and the like can be exemplified, but it is not limited thereto.

In the context of the present specification, $C_7$-$C_{16}$ alkylaryl represents a group obtained by removing one hydrogen atom from an aromatic hydrocarbon having the total carbon atom number of 7 to 16. It can be a group obtained by removing one hydrogen atom from the aryl moiety of an aromatic hydrocarbon or a group obtained by removing one hydrogen atom from the alkyl moiety of an aromatic hydrocarbon, preferably a group obtained by removing one hydrogen atom from the alkyl moiety of an aromatic hydrocarbon. As $C_7$-$C_{16}$ alkylaryl, it is preferably $C_7$-$C_{10}$ alkylphenyl. Among others, the alkyl moiety can be a linear or branched alkyl. For example, benzyl, phenylethyl, phenylpropyl, dimethylphenyl, naphthylmethyl, naphthylethyl and the like can be exemplified, but it is not limited thereto.

In the context of the present specification, $C_1$-$C_{10}$ alkyloxy represents a group attached aforesaid $C_1$-$C_{16}$ alkyl to —O— group. As $C_1$-$C_{10}$ alkyloxy, it is preferably $C_1$-$C_5$ alkyloxy, more preferably $C_1$-$C_3$ linear or branched alkyloxy.

[Amine-Based Polymer]

The present invention provides an amine-based polymer.

The amine-based polymer comprises a polymer main chain, and a structure represented by the following formula (I) is attached to the polymer main chain. Said structure is attached to the polymer main chain via an attaching end present in at least one of Group G, Group G' and Group A in the structure.

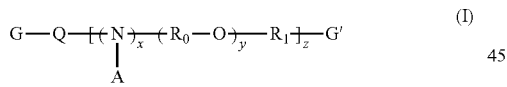

wherein, Group G and Group G' are each independently selected from

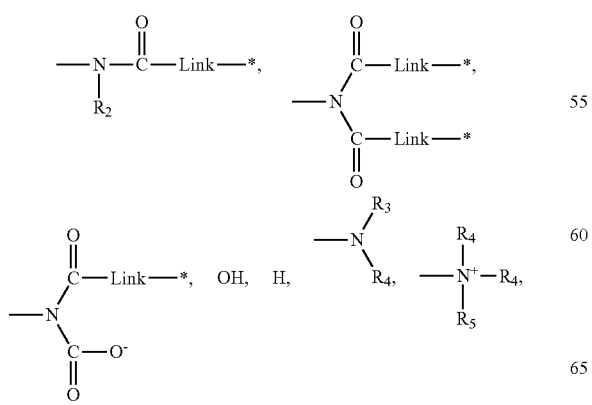

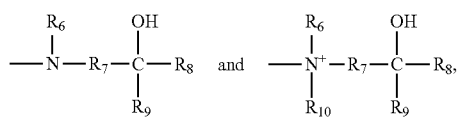

at least one of G and G' is selected from

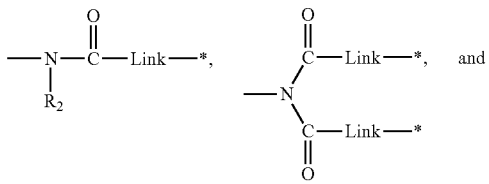

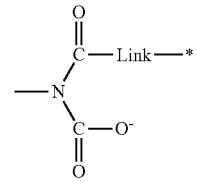

(preferably selected from 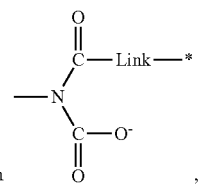, and

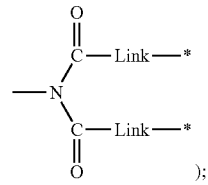
);

each Group A present in formula (I) is each independently selected from H, $R_{11}$,

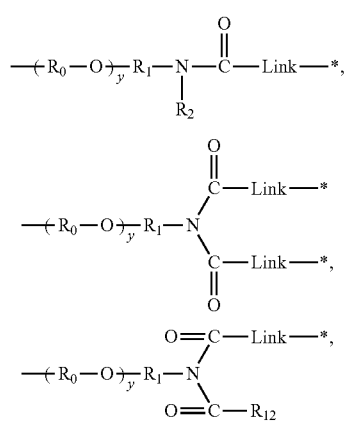

-continued

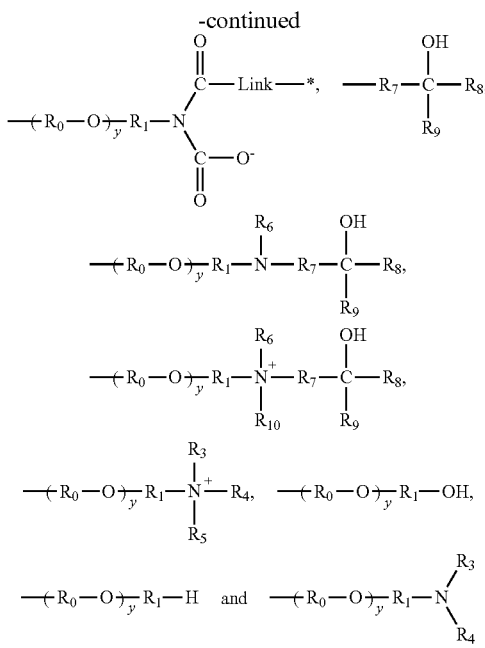

(preferably selected from H and $R_{11}$); the group Link represents a linking group, which is selected from a single bond and $C_1$-$C_{10}$ linear or branched hydrocarbylene (preferably $C_1$-$C_6$ linear or branched alkylene, further preferably $C_1$-$C_4$ linear or branched alkylene); * represents an attaching end for attaching to the polymer main chain, wherein two Link groups in each of the group

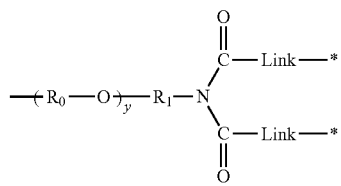

and the group

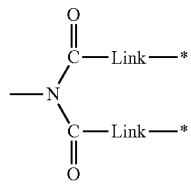

can be combined each other so that the group itself has one attaching end represented as *

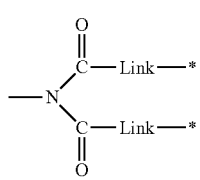

(preferably the moiety $\overset{O}{\|}$ converts to the moiety

-continued

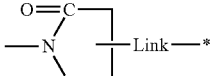
, wherein m represents an integer of 1-5 (preferably an integer of 1-3, more preferably 1 or 2), more preferably converts to at least one of 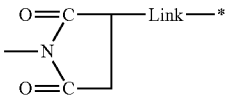,

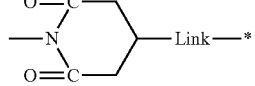 and

);

Q represents a single bond, $-(\!-\!R_0\!-\!O\!-\!)_y R_1\!-\!$ or $C_1$-$C_{10}$ linear or branched hydrocarbylene (preferably $C_1$-$C_6$ linear or branched alkylene, further preferably $C_1$-$C_4$ linear or branched alkylene); each x in formula (I) is each independently 0 or 1; each y in formula (I) is each independently a positive integer (preferably an integer of 1-10, more preferably an integer of 1-3); z is 0 or a positive integer (preferably an integer of 1-10, more preferably an integer of 1-3), when z is 0, Q does not represent a single bond; each $R_0$ and each $R_1$ in formula (I) are each independently selected from $C_1$-$C_{10}$ linear or branched alkylene (preferably $C_1$-$C_5$ linear or branched alkylene, more preferably methylene, ethylene and propylene); each $R_2$, each $R_3$, each $R_4$, each $R_5$ and each $R_6$ present in formula (I) are each independently selected from H and $C_1$-$C_{10}$ linear or branched alkyl (preferably $C_1$-$C_5$ linear or branched alkyl, more preferably $C_1$-$C_3$ linear or branched alkyl); each $R_7$ present in formula (I) is each independently selected from $C_1$-$C_{10}$ linear or branched alkylene (preferably $C_1$-$C_5$ linear or branched alkylene, more preferably $C_1$-$C_3$ linear or branched alkylene) and $C_7$-$C_{16}$ aralkylene (preferably $C_7$-$C_{10}$ phenylalkylene); each $R_8$ and each $R_9$ present in formula (I) are each independently selected from H, $C_1$-$C_{10}$ linear or branched alkyl (preferably $C_1$-$C_5$ linear or branched alkyl, more preferably $C_1$-$C_3$ linear or branched alkyl), $C_6$-$C_{16}$ aryl (preferably $C_6$-$C_{10}$ aryl) and $C_7$-$C_{16}$ alkylaryl (preferably $C_7$-$C_{10}$ alkylphenyl); each $R_{10}$ and each $R_{11}$ present in formula (I) are each independently selected from H and $C_1$-$C_{10}$ linear or branched alkyl (preferably $C_1$-$C_5$ linear or branched alkyl, more preferably $C_1$-$C_3$ linear or branched alkyl), each $R_{12}$ present in formula (I) is each independently selected from OH, halogen (preferably fluorine and chlorine), $C_1$-$C_{10}$ linear or branched alkyloxy (preferably $C_1$-$C_5$ linear or branched alkyloxy, more preferably $C_1$-$C_3$ linear or branched alkyloxy).

In an embodiment according to the present invention, At least one of Group G and Group G' is selected from

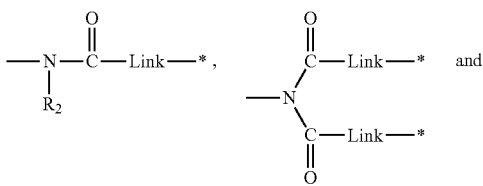

-continued

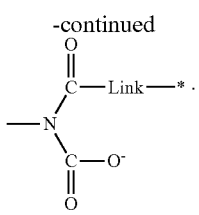

In an embodiment according to the present invention, Group A can be selected from

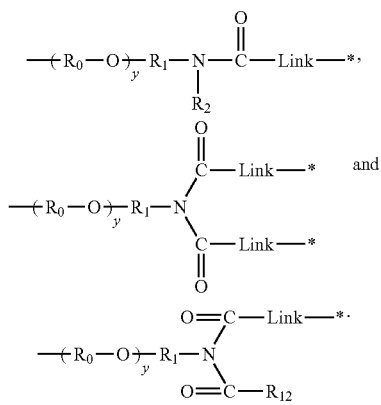

According to the present invention, * represents an attaching end for attaching the structure represented by formula (I) to the polymer main chain.

In an embodiment according to the present invention, the polymer main chain of the amine-based polymer can be attached to an attaching end present in at least one of Group G, Group G' and Group A in the structure represented by formula (I) via the —C— bond and/or the —O— bond. In an embodiment of the present invention, the —C— bond and/or the —O— bond locate on the polymer main chain, and thus constitute a part of the polymer main chain backbone.

More specifically, in an embodiment according to the present invention, the structure represented by formula (I) combines via an unbonded bond at a position indicated by * with the —C— bond and/or the —O— bond of the polymer main chain to form a covalent bond, thereby the structure represented by formula (I) is attached to the polymer main chain.

Based on this attaching manner, the structure represented by formula (I) is usually hanged on the polymer main chain in form of a terminal group, a side chain or both, thereby forming a hanging group (sometimes also referred to as a pendant group herein).

In an embodiment according to the present invention, the structure represented by formula (I) can be attached to the polymer main chain via an attaching end present in any of Group G, Group G' and Group A.

In an embodiment according to the present invention, the structure represented by formula (I) can be attached to the polymer main chain via an attaching end present in any of Group G and Group G'.

In an embodiment according to the present invention, in the structure represented by formula (I), there may be one or more Groups A, or Group A is absent (that is to say, each x in z repeating units is 0).

In an embodiment according to the present invention, two Link groups in each of the group

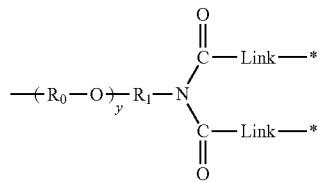

and the group

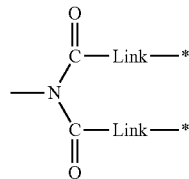

can be combined each other so that the group itself has one attaching end represented as *. In an embodiment according to the present invention, the

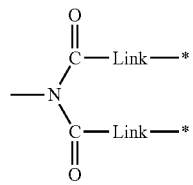

moiety converts to the

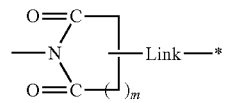

moiety, preferably converts to at least one of

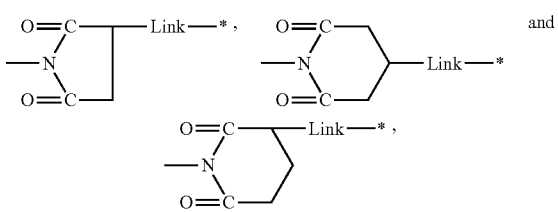

wherein m represents an integer of 1-5, preferably an integer of 1-3, more preferably 1 or 2.

In an embodiment according to the present invention, in formula (I), z is not 0, in z repeating units, when x in the terminal repeating unit attached to G-Q- is 0, Q is a single bond; when x in the terminal repeating unit attached to G-Q- is 1, Q is $-(R_0\!-\!O)_y\!-\!R_1-$, wherein the attaching end at the $R_0$ side is attached to G, the attaching end at the $R_1$ side is attached to the nitrogen atom in the terminal repeating unit

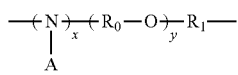

attached to G-Q- in z repeating units.

In an embodiment according to the present invention, In formula (I), when z is 0, Q represents $-(R_0-O)_y-R_1-$ or $C_1$-$C_{10}$ linear or branched hydrocarbylene, preferably $C_1$-$C_{10}$ to linear or branched hydrocarbylene, more preferably $C_1$-6 linear or branched alkylene, further preferably $C_1$-4 linear or branched alkylene.

In an embodiment according to the present invention, In formula (I), when z is 1, that is to say, when there is only one repeating unit

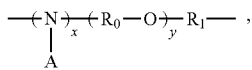

the structure represented by formula (I) is

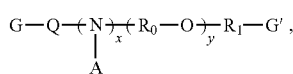

at this time, when x is 0, Q is a single bond, the structure represented by formula (I) is G-$(R_0-O)_y-R_1$-G'; when x is 1, Q is $-(R_0-O)_y-R_1-$, the structure represented by formula (I) is

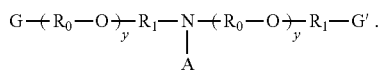

In an embodiment according to the present invention, In formula (I), when z is greater than 1, that is to say, there are z repeating units

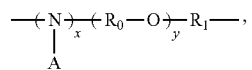

the structure represented by formula (I) is

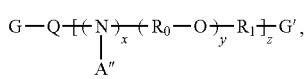

that is (II)

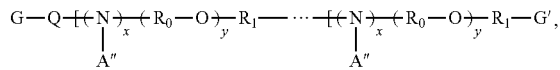

the omission symbol * * * therein represents the middle z repeating units

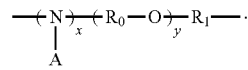

At this time, when x in the terminal repeating unit attached to G-Q- (x in the left side of formula (II)) is 0, Q is a single bond, that is to say, G is directly attached to $R_0$ in the terminal repeating unit; when x in the terminal repeating unit attached to G-Q- (x in the left side of formula (II)) is 1, Q is $-(R_0-O)_y-R_1-$, in said Q, the attaching end at the $R_0$ side is attached to G, and the attaching end at the $R_1$ side is attached to the nitrogen atom in the terminal repeating unit in z repeating units.

In an embodiment according to the present invention, in formula (I), for Group G and Group G', sometimes they could be selected from the groups having positive or negative charge(s) such as

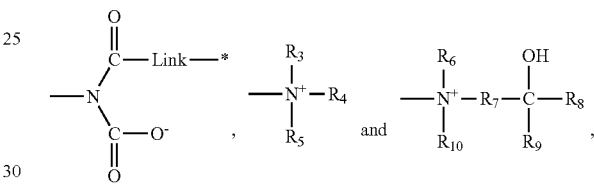

for Group A (possibly one or more, or also possible zero), sometimes it could be selected from the groups having positive or negative charge(s) such as

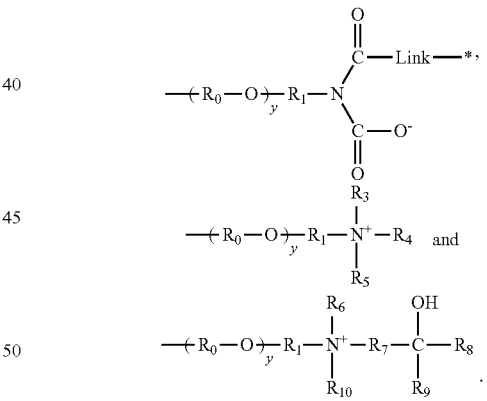

When Group G, Group G' and Group A in formula (I) are selected from the groups having positive or negative charge(s), it is possible that the sum of the charges carried by Group G, Group G' and Group A in formula (I) is 0, that is to say, an inner salt is formed in the amine-based polymer molecule. It is also possible that the sum of the charge numbers of the charged amine-based polymer ions and the counter ions is 0, that is to say, the charged amine-based polymer ions and the counter ions form a salt. In summary, the sum of the number of charges carried by the amine-based polymer molecule as a whole is zero, that is to say, the amine-based polymer as a whole is an electrically neutral molecule. In an embodiment according to the present invention, as the counter ion, it can be a cation, which may be at least one selected from the group consisting of lithium ion, sodium ion, potassium ion, magnesium ion, calcium ion, and barium ion; or an anion, which may be at least one selected from the group consisting of a halogen ion, a nitrate, a phosphate, a sulfate, and an acetate.

In an embodiment according to the present invention, in formula (I), the group Link represents a linking group, which is selected from a single bond and $C_1$-$C_{10}$ linear or branched hydrocarbylene. Herein, as said $C_1$-$C_{10}$ linear or branched hydrocarbylene, for example, $C_1$-$C_{10}$ linear or branched alkylene, $C_2$-$C_{10}$ linear or branched alkenylene and $C_2$-$C_{10}$ linear or branched alkynylene can be exemplified, and it is preferably $C_1$-$C_6$ linear or branched alkylene, further preferably $C_1$-$C_4$ linear or branched alkylene.

In an embodiment according to the present invention, each $R_0$ and each $R_1$ in formula (I) are identical to or different from each other, and are each independently selected from $C_1$-$C_{10}$ linear or branched alkylene, preferably selected from $C_1$-$C_5$ linear or branched alkylene, more preferably selected from methylene, ethylene and propylene.

In an embodiment according to the present invention, each $R_2$, each $R_3$, each $R_4$, each $R_5$ and each $R_6$ present in formula (I) are each independently selected from H and $C_1$-$C_{10}$ linear or branched alkyl, preferably selected from H and $C_1$-$C_5$ linear or branched alkyl, more preferably selected from H and $C_1$-$C_3$ linear or branched alkyl.

In an embodiment according to the present invention, each $R_7$ present in formula (I) is each independently selected from $C_1$-$C_{10}$ linear or branched alkylene and $C_7$-$C_{16}$ aralkylene, preferably selected from $C_1$-$C_5$ linear or branched alkylene and $C_7$-$C_{10}$ phenylalkylene, more preferably $C_1$-$C_3$ linear or branched alkylene.

In an embodiment according to the present invention, each $R_8$ and each $R_9$ present in formula (I) are each independently selected from H, $C_1$-$C_{10}$ linear or branched alkyl, $C_6$-$C_{16}$ aryl and $C_7$-$C_{16}$ alkylaryl, preferably selected from H, $C_1$-$C_5$ linear or branched alkyl, $C_6$-$C_{10}$ aryl and $C_7$-$C_{10}$ alkylphenyl, more preferably selected from H and $C_1$-$C_3$ linear or branched alkyl.

In an embodiment according to the present invention, each $R_{10}$ and each $R_{11}$ present in formula (I) are each independently selected from H and $C_1$-$C_{10}$ linear or branched alkyl, preferably selected from H and $C_1$-$C_5$ linear or branched alkyl, more preferably selected from H and $C_1$-$C_3$ linear or branched alkyl.

In an embodiment according to the present invention, each $R_{12}$ present in formula (I) is each independently selected from OH, halogen, $C_1$-$C_{10}$ linear or branched alkyloxy, preferably selected from OH, fluorine, chlorine, $C_1$-$C_5$ linear or branched alkyloxy, more preferably selected from OH, fluorine, chlorine and $C_1$-$C_3$ linear or branched alkyl.

In an embodiment according to the present invention, each x in formula (I) is each independently 0 or 1.

In an embodiment according to the present invention, each y in formula (I) is each independently a positive integer, preferably an integer of 1-10, more preferably an integer of 1-3.

In an embodiment according to the present invention, in formula (I), z is 0 or a positive integer, preferably an integer of 1-10, more preferably an integer of 1-3.

In an embodiment according to the present invention, when z is 0, Q does not represent a single bond.

In an embodiment according to the present invention, the amine-based polymer of the present invention has a polymer main chain, and said polymer main chain is attached to an attaching end present in Group G, Group G' or Group A of the structure represented by formula (I) via a —C— bond and/or a —O— bond,

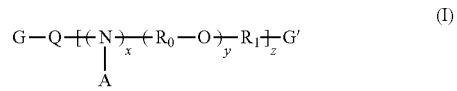

wherein, Group G or Group G' is each independently selected from

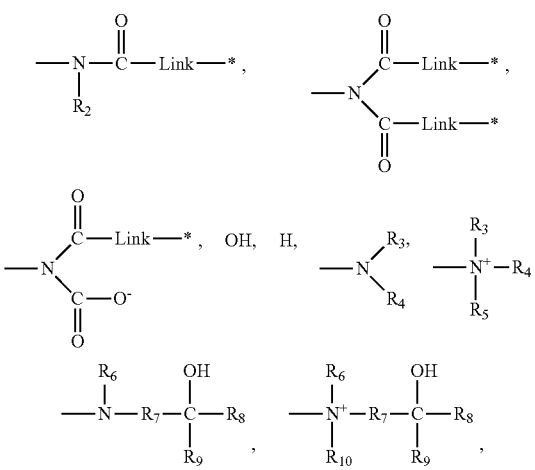

at least one G or G' is selected from

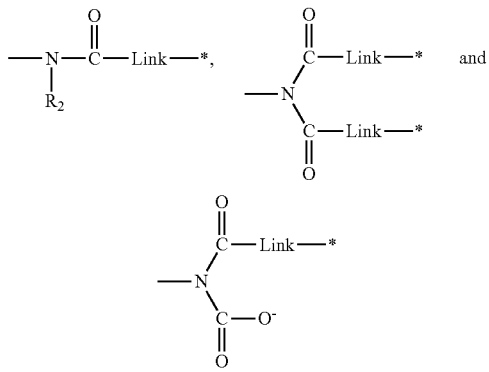

(preferably selected from

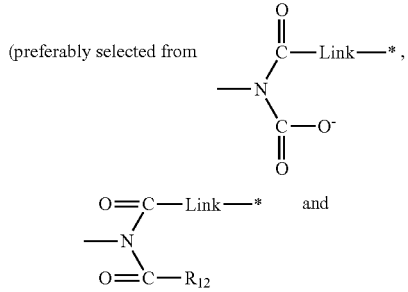

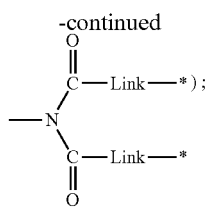

each Group A present in formula (I) is each independently selected from H, $R_{11}$,

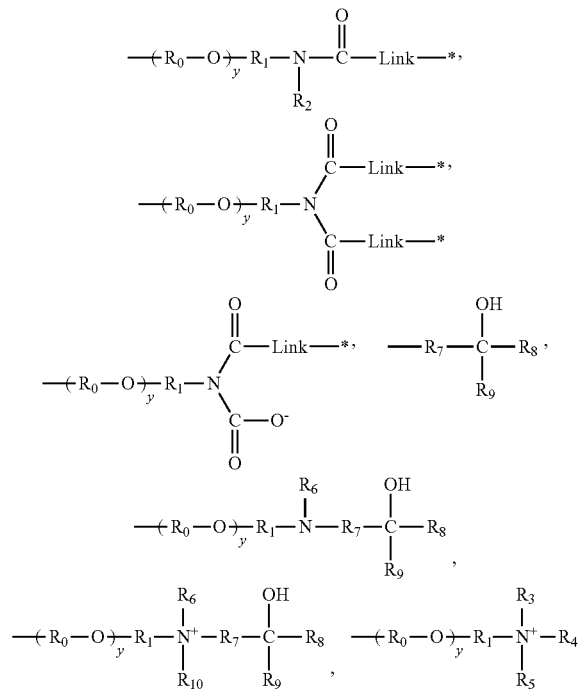

(preferably selected from H, $R_{11}$); the group Link represents a linking group, which is selected from a single bond and $C_1$-10 hydrocarbylene (preferably $C_1$-6 linear or branched alkylene, further preferably $C_1$-4 linear or branched alkylene); * represents an attaching end for attaching to the —C— bond or the —O— bond; Q is a single bond or $-(R_0-O-)_y R_1-$; each x in formula (I) is each independently selected from 0 or 1; each y in formula (I) is each independently a positive integral (preferably 1-10, most preferably 1-3); z is 0 or a positive integer (preferably 1-10, most preferably 1-3); each $R_0$ and each $R_1$ in formula (I) are each independently selected from $C_1$-$C_{10}$ alkylene (preferably $C_1$-$C_5$ linear or branched alkylene, most preferably methylene, ethylene, propylene); each $R_2$, each $R_3$, each $R_4$, each $R_5$ and each $R_6$ present in formula (I) is each independently selected from H or $C_1$-$C_{10}$ alkyl (preferably H or $C_1$-$C_5$ linear or branched alkyl, most preferably H or $C_1$-$C_3$ linear or branched alkyl); each $R_7$ present in formula (I) is each independently selected from $C_1$-$C_{10}$ alkylene, $C_6$-$C_{16}$ aralkylene (preferably $C_1$-$C_5$ linear or branched alkylene, $C_6$-$C_{10}$ phenylalkylene, most preferably $C_1$-$C_3$ linear or branched alkylene); each $R_8$ and each $R_9$ present in formula (I) are each independently selected from H, $C_1$-$C_{10}$ alkyl and $C_6$-$C_{16}$ aryl or alkylaryl (preferably H, $C_1$-$C_5$ linear or branched alkyl and $C_6$-$C_{10}$ phenyl or alkylphenyl, most preferably H or $C_1$-$C_3$ linear or branched alkyl); each $R_{10}$, each $R_{11}$ and each $R_{12}$ present in formula (I) are each independently selected from H or $C_1$-$C_{10}$ alkyl (preferably H or $C_1$-$C_5$ linear or branched alkyl, most preferably H or $C_1$-$C_3$ linear or branched alkyl).

In an embodiment according to the present invention, the polymer main chain of the amine-based polymer may be those commonly used in the art as fuel detergent, including but not limited to at least one selected from polyolefin, polyester and polyether, further preferably polyolefin, more homopolymer or copolymer of $C_{2-20}$ olefin, more preferably homopolymer or copolymer of $C_{2-10}$ olefin. In an embodiment according to the present invention, for the polymer main chain of the amine-based polymer, for example, polyethylene, polypropylene, polybutylene, polyisobutylene, polypentene, polyhexylene, polyoctylene, polynonylene, polydecylene and the like can be exemplified, but its example is not limited thereto. In an embodiment according to the present invention, the polymer main chain has a number-average molecular weight of 500-5000, preferably 500-2500, further preferably 500-1300.

In an embodiment according to the present invention, when one or more structures represented by formula (I) are attached to one polymer main chain of the amine-based polymer, that is to say, one or more structures represented by formula (I) as pendant groups are attached to one polymer main chain of the amine-based polymer, these pendant groups are independently present with each other, and the definitions of each group and each symbol in these pendant groups can be identical to or different from each other for different pendant groups/within the same pendant group. In this situation, these structures represented by formula (I) as pendant groups are each independently attached to the polymer main chain via attaching ends present in at least one of Group G, Group G' and Group A in each structure.

In an embodiment according to the present invention, when one structure represented by formula (I) is attached to one or more polymer main chains, that is to say, said one structure represented by formula (I) is attached to one or more polymer main chains, these polymer main chains are mutally independent to each other, and these polymer main chains can be each independently selected from those mentioned above as the polymer main chain. In this situation, the structure represented by formula (I) is attached to these polymer main chains via attaching ends present in at least one of Group G, Group G' and Group A of the structure represented by formula (I).

In an embodiment according to the present invention, a polymer contains the polymer main chain and has the structure represented by formula (I) attached to the polymer main chain, it is the amine-based polymer of the present invention. The amine-based polymer can be a single polymer that is the polymer having the structure represented by formula (I) attached to the polymer main chain, and can also be a mixture containing the polymer having the structure represented by formula (I) attached to the polymer main chain.

In an embodiment of the present invention, a mixture containing the polymer having the structure represented by formula (I) refers to that each polymer contains the polymer main chain and has the structure represented by formula (I), but it is a mixture of two or more polymers, wherein the structure, the polymerization degree and/or the type of the main chain in each polymer are different from each other.

In an embodiment of the present invention, a mixture containing the polymer having the structure represented by formula (I) refers to that each polymer contains the polymer main chain and has the structure represented by formula (I), but it is a mixture of two or more polymers, wherein the structure represented by formula (I) attached in each polymer is different from each other.

In an embodiment of the present invention, the amine-based polymer is a mixture containing the polymer in which the structure represented by formula (I) is attached to the polymer main chain.

[Process for Preparing the Amine-Based Polymer]

The present invention also provides a process for preparing the amine-based polymer, which comprising an acylation reaction step of a polymer comprising the —$COR_{13}$ group and/or the

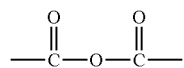

group attached onto the polymer main chain with the compound represented by formula (III),

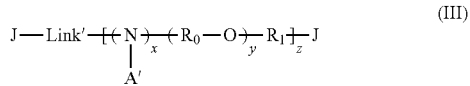

each x in the compound represented by formula (III) is each independently 0 or 1; each y in the compound represented by formula (III) is each independently a positive integer (preferably an integer of 1-10, more preferably an integer of 1-3); z is 0 or a positive integer (preferably an integer of 1-10, more preferably an integer of 1-3); each J is each independently selected from OH, H,

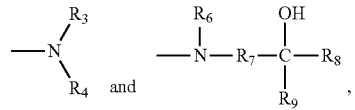

and among others at least one J is selected from

each A' in formula (III) is each independently selected from H, $R_{11}$,

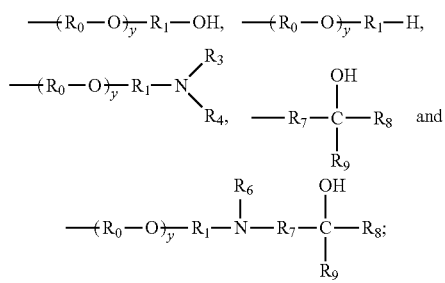

in the formula (III), each $R_0$ and each $R_1$ are each independently selected from $C_1$-$C_{10}$ linear or branched alkylene (preferably $C_1$-$C_5$ linear or branched alkylene, more preferably methylene, ethylene and propylene); each $R_3$, each $R_4$, each $R_6$ are each independently selected from H and $C_1$-$C_{10}$ linear or branched alkyl (preferably $C_1$-$C_5$ linear or branched alkyl, more preferably $C_1$-$C_3$ linear or branched alkyl); each $R_7$ is each independently selected from $C_1$-$C_{10}$ linear or branched alkylene (preferably $C_1$-$C_5$ linear or branched alkylene, more preferably $C_1$-$C_3$ linear or branched alkylene) and $C_7$-$C_{16}$ aralkylene (preferably $C_7$-$C_{10}$ phenylalkylene); each $R_8$ and each $R_9$ are each independently selected from H, $C_1$-$C_{10}$ linear or branched alkyl (preferably $C_1$-$C_5$ linear or branched alkyl, more preferably $C_1$-$C_3$ linear or branched alkyl), $C_6$-$C_{16}$ aryl (preferably $C_6$-$C_{10}$ aryl) and $C_7$-$C_{16}$ alkylaryl (preferably $C_7$-$C_{10}$ alkylphenyl); each $R_{11}$ is each independently selected from H and $C_1$-$C_{10}$ linear or branched alkyl (preferably $C_1$-$C_5$ linear or branched alkyl, more preferably $C_1$-$C_3$ linear or branched alkyl), $R_{13}$ is selected from OH, a halogen atom (preferably fluorine or chlorine), $C_1$-$C_{10}$ linear or branched alkyloxy (preferably $C_1$-$C_5$ linear or branched alkyloxy, more preferably $C_1$-$C_3$ linear or branched alkyloxy); the group Link' represents a linking group, and is selected from a single bond, —(—$R_0$—O—)$_y$$R_1$— and $C_1$-$C_{10}$ linear or branched hydrocarbylene (preferably $C_1$-$C_6$ linear or branched alkylene, further preferably $C_1$-$C_4$ linear or branched alkylene), when z is 0, the group Link' does not represent a single bond.

In an embodiment according to the present invention, in formula (III), z is not 0, in z repeating units, when x in the terminal repeating unit attached to J-Link' is 0, Link' is a single bond; when x in the terminal repeating unit attached to J-Link' is 1, Link' is —(—$R_0$—O—)$_y$$R_1$— or $C_1$-$C_{10}$ linear or branched hydrocarbylene, wherein when Link' is —(—$R_0$—O—)$_y$$R_1$—, the attaching end at the $R_0$ side is attached to J, the attaching end at the $R_1$ side is attached to the N atom of the terminal repeating unit

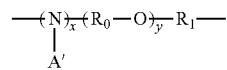

attached to J-Link' in z repeating units.

In an embodiment according to the present invention, the compound represented by formula (III) can be the following compound represented by formula (III'),

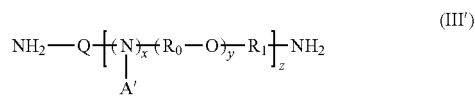

wherein A' is each independently selected from H, $R_{11}$,

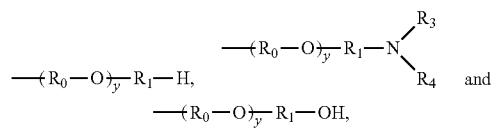

z is a positive integer (preferably an integer of 1-10, more preferably an integer of 1-3); in z repeating units, when x in the terminal repeating unit attached to NH2-Q- is 0, Q is a single bond; when x in the terminal repeating unit attached to NH2-Q- is 1, Q is —(—$R_0$—O—)$_y$$R_1$—.

In an embodiment according to the present invention, the compound represented by formula (III) can be

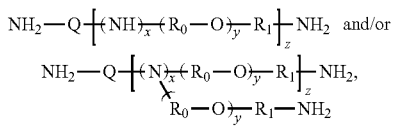

wherein x is 1, z is a positive integer (preferably an integer of 1-10, more preferably an integer of 1-3), Q is $-(R_0-O)_y-R_1-$.

As a specific example of the compound represented by formula (III), for example, 2-[2-(2-aminoethoxy)ethoxy]ethylamine, 3,6,9-trioxaundecane-1,11-diamine and N,N-dimethylpropanediamine can be exemplified.

In an embodiment according to the present invention, the reaction molar ratio of the polymer comprising the $—COR_{13}$ group and/or the

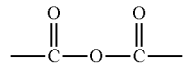

group attached onto the polymer main chain to the compound represented by formula (III) depends on the structure of the amine-based polymer to be prepared, that is to say, depends on the amount of the compound represented by formula (III) to be reacted with each unit of the polymer, and is generally 1:0.1-10, preferably 1:0.5-5, more preferably 1:0.5-2, further preferably 1:0.9-1.1.

In an embodiment according to the present invention, the polymer comprising the $—COR_{13}$ group and/or the

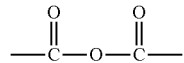

group attached onto the polymer main chain and the compound represented by formula (III) are reacted at a reaction temperature of 40° C.-180° C., preferably 40-150° C., more preferably 40-80° C.

In an embodiment according to the present invention, the polymer comprising the $—COR_{13}$ group and/or the

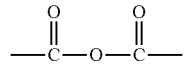

group attached onto the polymer main chain and the compound represented by formula (III) are reacted under a reaction pressure of 0.1-10 MPa, preferably 0.1-5 MPa.

In an embodiment according to the present invention, the polymer comprising the $—COR_{13}$ group and/or the

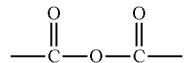

group attached onto the polymer main chain and the compound represented by formula (III) are reacted for a reaction period of 0.1 h-5 h, preferably 0.2 h-2 h, more preferably 0.2 h-1.5 h.

In an embodiment according to the present invention, in the reaction of the polymer comprising the $—COR_{13}$ group and/or the

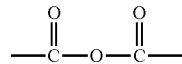

group attached onto the polymer main chain with the compound represented by formula (III), a solvent may be used, or a solvent may not be used. When a solvent is used, as the solvent, one or more of toluene, petroleum ether and base oil can be used, and petroleum ether is preferably used. The amount of the solvent may be a conventionally used amount, preferably from 10% to 200% by mass of the polymer comprising the $—COR_{13}$ group and/or the

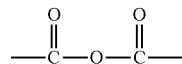

group attached onto the polymer main chain. The solvent can be removed after completion of the reaction by methods known to those skilled in the art.

In an embodiment according to the present invention, the process for preparing the amine-based polymer comprising an acylation reaction step of a polymer comprising the $—COOH$ group and/or the

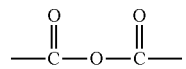

group attached onto the polymer main chain with the compound represented by formula (III),

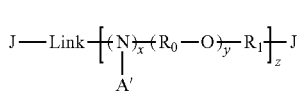 (III)

each x in the compound represented by formula (III) is each independently selected from 0 or 1; each y in the compound represented by formula (III) is each independently a positive integer (preferably 1-10, most preferably 1-3); z is 0 or a positive integer (preferably 1-10, most preferably 1-3); each J is each independently selected from OH, H,

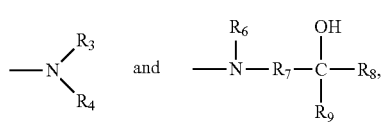

and among others at least one J is selected from

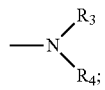

A' is selected from

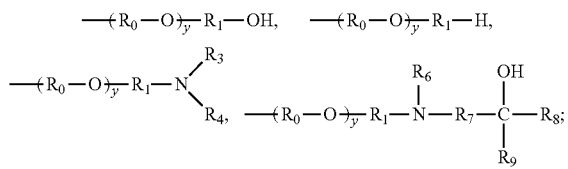

in the formula (III), each $R_0$ and each $R_1$ are each independently selected from $C_1$-$C_{10}$ alkylene (preferably $C_1$-$C_5$ linear or branched alkylene, most preferably methylene, ethylene, propylene); each $R_3$, each $R_4$, each $R_5$, and each $R_6$ present in formula (I) are each independently selected from H or $C_1$-$C_{10}$ alkyl (preferably H or $C_1$-$C_5$ linear or branched alkyl, most preferably H or $C_1$-$C_3$ linear or branched alkyl); each $R_7$ present in formula (I) is each independently selected from $C_1$-$C_{10}$ alkylene, $C_6$-$C_{16}$ aralkylene (preferably $C_1$-$C_5$ linear or branched alkylene, $C_6$-$C_{10}$ phenylalkylene, most preferably $C_1$-$C_3$ linear or branched alkylene); each $R_5$ and each $R_9$ present in formula (I) are each independently selected from H, $C_1$-$C_{10}$ alkyl and $C_6$-$C_{16}$ aryl or alkylaryl (preferably H, $C_1$-$C_5$ linear or branched alkyl and $C_6$-$C_{10}$ phenyl or alkylphenyl, most preferably H or $C_1$-$C_3$ linear or branched alkyl); the group Link represents a linking group, which is selected from a single bond and $C_1$-10 hydrocarbylene (preferably $C_1$-6 linear or branched alkylene, further preferably $C_1$-4 linear or branched alkylene).

In an embodiment according to the present invention, the polymer comprising the —$COR_{13}$ group and/or the

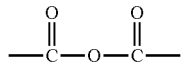

group attached onto the polymer main chain is preferably a polymer containing q groups of —$COR_{13}$ and/or

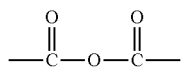

per the polymer molecule, wherein said q is the ratio of the total number of the —$COR_{13}$ group and the

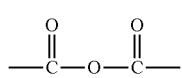

group in the polymer to the total number of the polymer molecule. Since it is an average, it can be a non-integer number. In an embodiment according to the present invention, q is in the following range: $1 \leq q \leq 10$, preferably $1 \leq q \leq 5$.

The polymer main chain of said polymer containing q groups of —$COR_{13}$ and/or

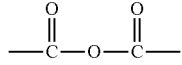

per the polymer molecule is preferably at least one selected from polyolefin, polyether and polyester. In an embodiment according to the present invention, said polymer main chain is polyolefin. In an embodiment according to the present invention, said polymer main chain is preferably homopolymer or copolymer of $C_{2-10}$ olefin. In an embodiment according to the present invention, as said polymer main chain, polyethylene, polypropylene, polybutylene, polyisobutylene, polypentene, polyhexylene, polyoctylene, polynonylene, polydecylene and the like can be exemplified, but its example is not limited thereto. In an embodiment according to the present invention, the polymer main chain of the polymer comprising the —$COR_{13}$ group and/or the

group attached onto the polymer main chain has a number-average molecular weight of 500-5000, preferably 500-2500, further preferably 500-1300.

In an embodiment according to the present invention, the polymer comprising the —COOH group and/or the

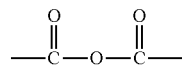

group attached onto the polymer main chain is a polymer containing q groups of —COOH and/or

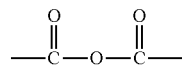

in the molecule, wherein said q is the ratio of the total number of the —COOH group and the

group in the polymer to the total number of the polymer molecule (preferably, q is in the following range: $1 \leq q \leq 10$, more preferably $1 \leq q \leq 5$). Said polymer containing q groups of —COOH and/or

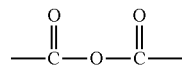

in the molecule is polyolefin, polyether or polyester containing q groups of —COOH and/or

in the molecule.

In an embodiment according to the present invention, the polymer comprising the —COR$_{13}$ group and/or the

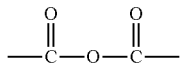

group attached onto the polymer main chain is preferably a product of the addition reaction of a polymer containing C=C bond(s) with an alkenyl acid and/or an alkenyl anhydride, more preferably a product of the addition reaction of a polymer containing u C=C bonds per the polymer molecule with an alkenyl acid and/or an alkenyl anhydride. Among others, said u is a ratio of the total number of C=C bonds in the polymer to the total number of the polymer molecule. Since it is an average, it can be a non-integer number. In an embodiment according to the present invention, u is in the following range: $1 \leq u \leq 10$, more preferably $1 \leq u \leq 5$.

In an embodiment according to the present invention, the polymer comprising the —COOH group and/or the

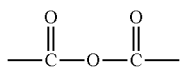

group attached onto the polymer main chain is a product of the addition reaction of a polymer containing C=C bond(s) with an alkenyl acid and/or an alkenyl anhydride (preferably a product of the addition reaction of a polymer containing u C=C bonds in the molecule with an alkenyl acid and/or an alkenyl anhydride, wherein said u is a ratio of the total number of C=C bonds in the polymer to the total number of the polymer molecule, u is preferably in the following range: $1 \leq u \leq 10$, more preferably $1 \leq u \leq 5$; more preferably a product of the addition reaction of polyolefin, polyether or polyester containing u C=C bonds in the molecule with an alkenyl acid and/or an alkenyl anhydride).

In an embodiment according to the present invention, the polymer comprising the —COR$_{13}$ group and/or the

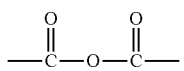

group attached onto the polymer main chain is preferably a product of the addition reaction of a polymer containing u C=C bonds per the polymer molecule and being at least one selected from polyolefin, polyether and polyester (preferably polyolefin, more preferably homopolymer or copolymer of C$_{2-10}$ olefin) with an alkenyl acid and/or an alkenyl anhydride.

In an embodiment according to the present invention, said polymer containing u C=C bonds per the polymer molecule is preferably polyolefin, more preferably homopolymer or copolymer of C$_{2-10}$ olefin. In an embodiment according to the present invention, as the polymer moiety, polyethylene, polypropylene, polybutylene, polyisobutylene, polypentene, polyhexylene, polyoctylene, polynonylene, polydecylene and the like can be exemplified, but its example is not limited thereto.

In an embodiment according to the present invention, said polymer containing C=C bond(s) is preferably a polymer containing 1-2 C=C bond(s) per the polymer molecule, more preferably a polyolefin containing 1-2 C=C bond(s) per the polymer molecule, more preferably a homopolymer or copolymer of C$_{2-10}$ olefin containing 1-2 C=C bond(s) per the polymer molecule, further preferably a homopolymer or copolymer of C$_{2-10}$ α-olefin containing 1-2 C=C bond(s) per the polymer molecule.

In an embodiment according to the present invention, said polyolefin containing 1-2 C=C bond(s) per the polymer molecule can be one or more selected from polyethylene, polypropylene, polybutylene, polyisobutylene, polypentene, polyhexylene, polyoctylene, polynonylene and polydecylene. In an embodiment according to the present invention, said polymer containing the C=C bond(s) in the polymer molecule is preferably a poly-α-olefin containing more than one, preferably 1-2 —CH=CH$_2$ bond(s) per the polymer molecule obtained by polymerization of C$_{2-10}$ α-olefin. In an embodiment according to the present invention, the poly-α-olefin containing more than one, preferably 1-2 —CH=CH$_2$ bond(s) per the polymer molecule for example can be one or more selected from polyethylene, polypropylene, polybutylene, polyisobutylene, polypentene, polyhexylene, polyoctylene, polynonylene and polydecylene.

In an embodiment according to the present invention, the polymer main chain of the polymer containing C=C bond(s) has a number-average molecular weight of 500-5000, preferably 500-2500, further preferably 500-1300.

According to the present invention, the alkenyl acid refers to an organic acid having at least one carbon-carbon double bond in its molecular structure, and preferably an organic acid having one carbon-carbon double bond in its molecular structure. The alkenyl anhydride refers to an organic acid anhydride having at least one carbon-carbon double bond in its molecular structure, and is preferably an organic acid anhydride formed by dehydration of the above alkenyl acid. In an embodiment according to the present invention, said alkenyl acid and/or said alkenyl anhydride are preferably a C$_3$-C$_{10}$ alkenyl acid and/or a C$_4$-C$_{20}$ alkenyl acid anhydride having at least one (preferably one) carbon-carbon double bond, and more preferably a C$_4$-C$_{10}$ alkenyl diacid and/or a C$_4$-C$_{15}$ alkenyl diacid anhydride having at least one (preferably one) carbon-carbon double bond.

According to the present invention, the C$_3$-C$_{10}$ alkenyl acid having at least one (preferably one) carbon-carbon double bond refers to a monobasic organic acid having a total carbon number of 3-10 and containing at least one (preferably one) carbon-carbon double bond. As the specific example, for example one or more of acrylic acid, butenoic acid, pentenoic acid, hexenoic acid, heptenoic acid, octylenic acid, nonenoic acid, and decylenic acid can be exemplified, but it is not limited thereto. According to the present invention, the C$_4$-C$_{10}$ alkenyl diacid having at least one (preferably one) carbon-carbon double bond refers to a dibasic organic acid having a total carbon number of 4-10 and containing at least one (preferably one) carbon-carbon double bond. As the specific example, for example one or more of butene diacid, pentene diacid, hexene diacid, heptylene diacid, octene diacid, nonene diacid, and decylene diacid can be exemplified, but it is not limited thereto. The C$_4$-C$_{20}$ alkenyl anhydride containing at least one (preferably one) carbon-carbon double bond refers to an organic acid anhydride having a total carbon number of 4-20 and containing at least one (preferably one) carbon-carbon double bond. As the specific example, for example acrylic anhydride, butenoic anhydride and the like can be exemplified, but it is not limited thereto.

According to the present invention, the $C_4$-$C_{15}$ alkenyl diacid anhydride containing at least one (preferably one) carbon-carbon double bond refers to an acid anhydride formed of a dibasic organic acid having a total carbon number of 4-15 and containing at least one (preferably one) carbon-carbon double bond. As the specific example, for example one or more of maleic anhydride, butene diacid anhydride, pentene diacid anhydride, hexene diacid anhydride, heptylene diacid anhydride, octene diacid anhydride, nonene diacid anhydride and decylene diacid anhydride can be exemplified, but it is not limited thereto.

In an embodiment of the present invention, said alkenyl acid and/or said alkenyl anhydride is $C_{3-10}$alkenyl acid and/or alkenyl anhydride (preferably $C_{4-10}$ alkenyl diacid and/or alkenyl diacid anhydride, more preferably one or more of acrylic acid, butenoic acid, pentenoic acid, hexenoic acid, heptenoic acid, octylenic acid, nonenoic acid, decylenic acid, butene diacid, pentene diacid, hexene diacid, heptylene diacid, octene diacid, nonene diacid, decylene diacid, maleic anhydride, butene diacid anhydride, pentene diacid anhydride, hexene diacid anhydride, heptylene diacid anhydride, octene diacid anhydride, nonene diacid anhydride and decylene diacid anhydride).

In an embodiment of the present invention, the reaction molar ratio of the polymer containing C=C bond(s) to the alkenyl acid and/or the alkenyl anhydride depends on the amount of alkenyl acid and/or alkenyl anhydride to be added per the amount of polymer, and based on the total molar number of the C=C bonds contained in the polymer, is generally 1:0.1-10, preferably 1:0.5-5, more preferably 1:0.9-1.1.

In an embodiment according to the present invention, the polymer containing C=C bond(s) and the alkenyl acid and/or the alkenyl anhydride are reacted at a reaction temperature of 100-350° C., preferably 200-300° C.

In an embodiment according to the present invention, the polymer containing C=C bond(s) and the alkenyl acid and/or the alkenyl anhydride are reacted under a reaction pressure of 0.1-10 MPa, preferably 0.1-5 MPa.

In an embodiment according to the present invention, the polymer containing C=C bond(s) and the alkenyl acid and/or the alkenyl anhydride are reacted for a reaction period of 0.1 h-10 h, preferably 0.5 h-10 h.

In an embodiment according to the present invention, in the reaction process of the reaction of the polymer containing C=C bond(s) and the alkenyl acid and/or the alkenyl anhydride, an inert gas is preferably introduced, more preferably nitrogen is introduced.

In an embodiment according to the present invention, in the reaction of the polymer containing C=C bond(s) and the alkenyl acid and/or the alkenyl anhydride, a solvent may be used, or a solvent may not be used. When a solvent is used, as the solvent, one or more of toluene, petroleum ether and base oil can be used, and petroleum ether is preferably used. In an embodiment according to the present invention, the amount of the solvent may be a conventionally used amount, preferably from 10% to 200% by mass of the polymer containing C=C bond(s). In an embodiment according to the present invention, the solvent can be removed after completion of the reaction by methods known to those skilled in the art.

In an embodiment according to the present invention, upon reacting the reaction product of the polymer containing C=C bond(s) and the alkenyl acid and/or alkenyl anhydride with the compound represented by formula (III), by controlling the reaction conditions, a polymer containing a imide group can be formed, and a polymer containing an amide group and a carboxylic acid group can also be formed.

In an embodiment according to the present invention, upon reacting the reaction product of the polymer containing C=C bond(s) and the alkenyl acid and/or alkenyl anhydride with the compound represented by formula (III), by controlling the reaction conditions, an amine-based polymer containing an amino group can be formed.

In an embodiment according to the present invention, the amine-based polymer can contain an amino group in the structure represented by formula (I). In an embodiment according to the present invention, said amine-based polymer containing an amino group can be further subjected to the quaterisation reaction with a quaternizing agent. The reaction product thus obtained is also included in the scope of protection of the present invention.

In an embodiment according to the present invention, the quaterisation reaction of said amine-based polymer containing an amino group can be carried out in the reaction conditions well known in the art. In an embodiment according to the present invention, the quaterisation reaction comprises: a step of reacting said amine-based polymer containing an amino group with a quaternizing agent. In an embodiment according to the present invention, the quaternizing agent can be a quaternizing agent well known in the art. In an embodiment according to the present invention, the quaternizing agent is one or more selected from dialkyl sulfate ester, hydrocarbyl-substituted carbonate (preferably alkyl-substituted carbonate) and hydrocarbyl epoxide (preferably alkyl epoxide). As the quaternizing agent of the present invention, for example, one or more of styrene oxide, propylene oxide, ethylene oxide, dimethyl carbonate and diethyl carbonate can be exemplified.

In an embodiment according to the present invention, the reaction molar ratio of said amine-based polymer containing an amino group to the quaternizing agent in the quaterisation reaction is 1:0.5-5, preferably 1:0.9-1.1. In an embodiment according to the present invention, the reaction temperature of said quaterisation reaction is 50° C.-80° C., preferably 60° C.-70° C. In an embodiment according to the present invention, the reaction pressure of said quaterisation reaction is 0.1-10 MPa, preferably 0.1-5 MPa. In an embodiment according to the present invention, the reaction time of said quaterisation reaction is 1 h-10 h, preferably 3 h-5 h. In an embodiment according to the present invention, an inert gas (preferably nitrogen) is introduced in the quaterisation reaction process.

In an embodiment according to the present invention, after the completion of the preparation process of the amine-based polymer, the optionally added catalyst and/or solvent can be removed from the finally obtained reaction mixture with the method well known in the art to obtain the amine-based polymer of the present invention.

[Preferable Structure of the Amine-Based Polymer and the Preparation Process Thereof]

In an embodiment of the present invention, said amine-based polymer comprises a structure represented by the following formula (IV):

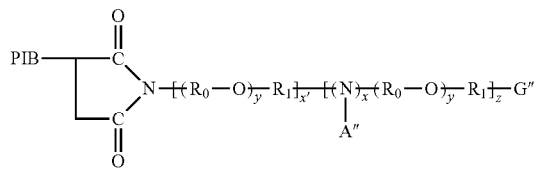

wherein A″ is each independently selected from H, $-(R_0-O-)_y R_1-H$, $-(R_0-O-)_y R_1-NH_2$ and $-(R_0-O-)_y R_1-OH$; G″ is selected from OH, H,

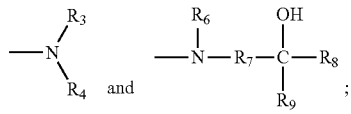

z is an integer of 1-10, preferably an integer of 1-3; x' is 0 or 1, in z repeating units, when x in the terminal repeating unit attached to the nitrogen atom of the imide group via $-[-(R_0-O-)_y R_1-]_{x'}$ is 0, x' is 0; when x in the terminal repeating unit attached to the nitrogen atom of the imide group via $-[-(R_0-O-)_y R_1-]_{x'}$ is 1, x' is 1; the definitions of other groups and symbols in the formula (IV) are the same as described above, and PIB represents polyisobutene.

In an embodiment of the present invention, the process for preparing an amine-based polymer polymer represented by the above formula (IV) comprises: a step of reacting polyisobutylene succinic anhydride with

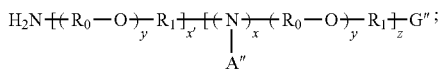

the definitions of each of groups and symbols in

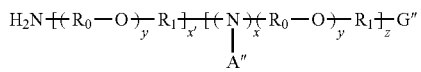

are the same as described above for formula (IV). Preferably, the molar ratio between the two is 1:0.9-1.1. Preferably, the reaction temperature is 120° C.-180° C. Preferably, the reaction time is 0.5 h-4 h. Preferably, the solvent is petroleum ether or no solvent is used. Preferably, an inert gas (preferably nitrogen) is introduced during the reaction process.

In an embodiment of the present invention, the amine-based polymer comprises a structure represented by the following formula (V):

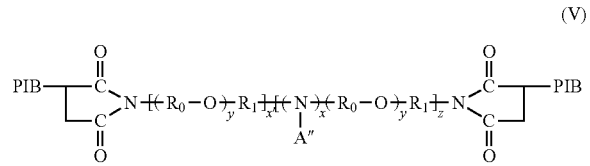

(V)

wherein A″ is each independently selected from H $-(R_0-O-)_y R_1-H$, $-(R_0-O-)_y R_1-NH_2$, and $-(R_0-O-)_y R_1-OH$; z is an integer of 1-10, preferably an integer of 1-3; x' is 0 or 1, in z repeating units, when x in the terminal repeating unit attached to the nitrogen atom of the imide group via $-[-(R_0-O-)_y R_1-]_{x'}$ is 0, x' is 0; when x in the terminal repeating unit attached to the nitrogen atom of the imide group via $-[-(R_0-O-)_y R_1-]_{x'}$ is 1, x' is 1; the definitions of other groups and symbols in the formula (V) are the same as described above, and PIB represents polyisobutene.

In an embodiment of the present invention, the process for preparing an amine-based polymer polymer represented by the above formula (V) comprises: a step of reacting polyisobutylene succinic anhydride with

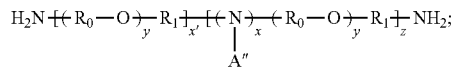

the definitions of each of groups and symbols in

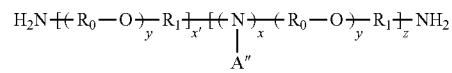

are the same as described above for formula (V). Preferably, the molar ratio between the two is 1.9-2.1:1. Preferably, the reaction temperature is 120° C.-180° C. Preferably, the reaction time is 0.5 h-4 h. Preferably, the solvent is petroleum ether or no solvent is used. Preferably, an inert gas (preferably nitrogen) is introduced during the reaction process.

In an embodiment of the present invention, the amine-based polymer comprises a structure represented by the following formula (VI):

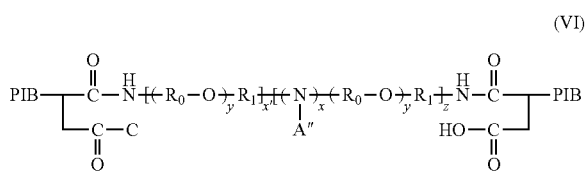

(VI)

wherein A″ is each independently selected from H, $-(R_0-O-)_y R_1-H$, $-(R_0-O-)_y R_1-NH_2$, and $-(R_0-O-)_y R_1-OH$; z is an integer of 1-10, preferably an integer of 1-3; x' is 0 or 1, in z repeating units, when x in the terminal repeating unit attached to the nitrogen atom of the imide group via $-[-(R_0-O-)_y R_1-]_{x'}$ is 0, x' is 0; when x in the terminal repeating unit attached to the nitrogen atom of the imide group via $-[-(R_0-O-)_y R_1-]_{x'}$ is 1, x' is 1; the definitions of other groups and symbols in the formula (VI) are the same as described above, and PIB represents polyisobutene.

In an embodiment of the present invention, the process for preparing an amine-based polymer polymer represented by the above formula (VI) comprises: a step of reacting polyisobutylene succinic anhydride with

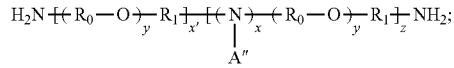

the definitions of each of groups and symbols in

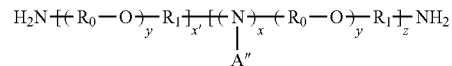

are the same as described above for formula (VI). Preferably, the molar ratio between the two is 1.9-2.1:1. Preferably, the reaction temperature is 40° C.-70° C. Preferably, the reaction time is 0.5 h-4 h. Preferably, the solvent is petroleum ether or no solvent is used. Preferably, an inert gas (preferably nitrogen) is introduced during the reaction process.

In an embodiment of the present invention, the amine-based polymer comprises a structure represented by the following formula (VII):

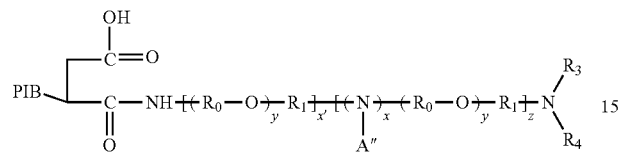
(VII)

wherein A" is each independently selected from H,

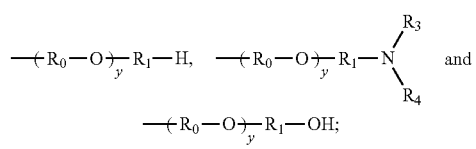

$z$ is an integer of 1-10, preferably an integer of 1-3; $x'$ is 0 or 1, in $z$ repeating units, when $x$ in the terminal repeating unit attached to the nitrogen atom of the imide group via $+(R_0-O)_y R_1+_{x'}$ is 0, $x'$ is 0; when $x$ in the terminal repeating unit attached to the nitrogen atom of the imide group via $+(R_0-O)_y R_1+_{x'}$ is 1, $x'$ is 1; the definitions of other groups and symbols in the formula (VII) are the same as described above, and PIB represents polyisobutene.

In an embodiment of the present invention, the process for preparing an amine-based polymer represented by the above formula (VII) comprises: a step of reacting polyisobutylene succinic anhydride with

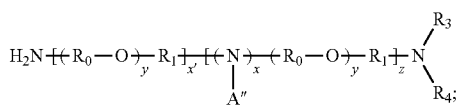

the definitions of each of groups and symbols in

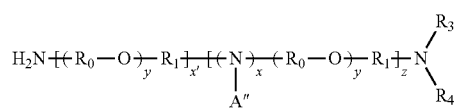

are the same as described above for formula (VII). Preferably, the molar ratio of the polyisobutylene succinic anhydride to

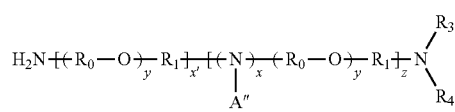

is 1:0.9-1.1. Preferably, the reaction temperature for the reaction of the polyisobutylene succinic anhydride and

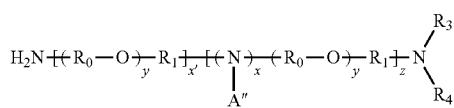

is 40° C.-70° C. Preferably, the reaction time is 0.2 h-1 h. Preferably, the solvent is petroleum ether or no solvent is used. Preferably, an inert gas (preferably nitrogen) is introduced during the reaction process.

In an embodiment of the present invention, the amine-based polymer comprises a structure represented by the following formula (VIII):

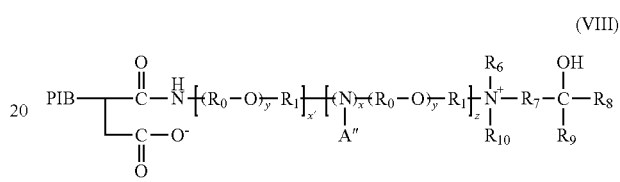
(VIII)

wherein A" is each independently selected from H,

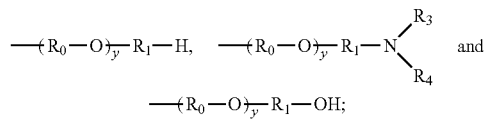

$z$ is an integer of 1-10, preferably an integer of 1-3; $x'$ is 0 or 1, in $z$ repeating units, when $x$ in the terminal repeating unit attached to the nitrogen atom of the imide group via $+(R_0-O)_y R_1+_{x'}$ is 0, $x'$ is 0; when $x$ in the terminal repeating unit attached to the nitrogen atom of the imide group via $+(R_0-O)_y R_1+_{x'}$ is 1, $x'$ is 1; the definitions of other groups and symbols in the formula (VIII) are the same as described above, and PIB represents polyisobutene.

In an embodiment of the present invention, the process for preparing an amine-based polymer represented by the above formula (VIII) comprises:

a step of reacting polyisobutylene succinic anhydride with

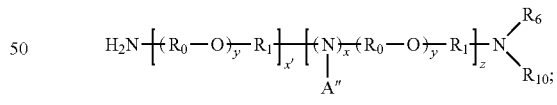

and a step of subjecting the reaction product and a quaternizing agent to a quaterisation reaction; said quaternizing agent has a structure of

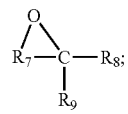

the definitions of each of groups and symbols therein are the same as described above for formula (VIII). Preferably, the molar ratio of polyisobutylene succinic anhydride:

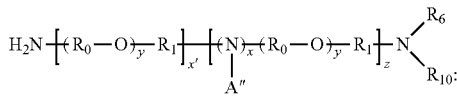

the quaternizing agent is 1:0.9-1.1:0.9-1.1. Preferably, the reaction temperature of the reaction of the polyisobutylene succinic anhydride and

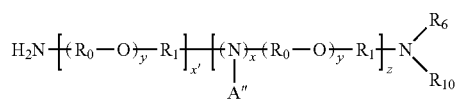

is 40° C.-70° C. Preferably, the amidation reaction time is 0.2 h-1 h. Preferably, in the amidation reaction, the solvent is petroleum ether or no solvent is used. Preferably, an inert gas (preferably nitrogen) is introduced during the amidation reaction process. Preferably, the temperature of the quaterisation reaction is 60° C.-70° C. Preferably, the quaterisation reaction time is 3 h-7 h.

In the amine-based polymers of the above formula (IV) to formula (VIII), the PIB moiety may be replaced with a polymer of $C_2$-$C_{10}$ alpha-olefin, and more specifically, the PIB moiety may be replaced with one or more selected from polyethylene, polypropylene, polybutylene, polypentene, polyhexylene, polyoctylene, polynonylene and polydecylene. Correspondingly, in the process for preparing the amine-based polymers of the above formula (IV) to formula (VIII), the PIB moiety may be replaced with a polymer of $C_2$-$C_{10}$ alpha-olefin, and more specifically, the PIB moiety may be replaced with one or more selected from polyethylene, polypropylene, polybutylene, polypentene, polyhexylene, polyoctylene, polynonylene and polydecylene.

[Composition]

The composition of the present invention comprises the amine-based polymer of the present invention, or an amine-based polymer produced by the process of the present invention.

The composition of the present invention could be in the form of lubricant composition, and also could be in the form of detergent composition.

[Use of the Amine-Based Polymer]

The amine-based polymer of the present invention, an amine-based polymer produced by the process of the present invention can be used as fuel detergent, which can effectively suppress the formation of deposits and improve the dispersibility of deposits, thereby improving the fuel economy of the internal combustion engine.

EXAMPLES

Hereinafter, the invention is further illustrated by the examples. These examples illustrate certain embodiments of the invention but are not intended to limit the invention. Those skilled in the art can use the above-mentioned description of the invention to replace the following examples with equally changed equivalent examples.

The main raw materials used in the examples are as follows:
Polyisobutylene succinic anhydride (PIBSA): Mn=1000 (a product available from Xinxiang Ruifeng New Materials Co., Ltd.)
2-[2-(2-aminoethoxy)ethoxy]ethylamine (EDOBEA) CAS: 929-59-9, Mw=148.2
Triethylenetetramine (TETA) CAS: 112-24-3, Mw=146.23
Styrene oxide CAS: 96-09-3, Mw=120.15
Propylene oxide CAS: 75-56-9, Mw=58.08
N,N-dimethylpropanediamine (DMAPA) CAS: 109-55-7, Mw=102.18

Example 1

The polymer of Example 1 was prepared from the reaction of polyisobutylene succinic anhydride with 2-[2-(2-aminoethoxy)ethoxy]ethylamine (EDOBEA).

To a four-necked flask equipped with a thermometer and a stirrer were added a solution of 7.11 g (0.048 mol) 2-[2-(2-aminoethoxy)ethoxy]ethylamine (EDOBEA) in 10 g petroleum ether at room temperature. 40 g (0.04 mol) polyisobutylene succinic anhydride was dissolved in 20 g petroleum ether (60-90° C.), and slowly added dropwise into the four-necked flask under the protection of nitrogen gas over 90 minutes. The mixture was stirred, and the reaction temperature was maintained at 110° C. After the completion of the dropwise addition, the mixture was warmed up to 180° C. and the reaction was maintained for 4 hours. Solvents were removed from the resulting reaction mixture to produce the amine-based polymer (PIBSI-EDOBEA) of Example 1.

The illustrative reaction equation of Example 1 is as follows:

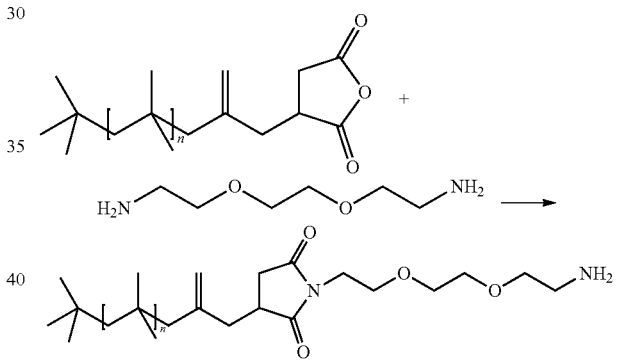

Comparative Example 1

The polymer of Comparative Example 1 can be a commercially available polyisobutylene succinimide-based PIBSI-TETA, or can be prepared from the reaction of polyisobutylene succinic anhydride with triethylenetetramine (TETA).

To a four-necked flask equipped with a thermometer and a stirrer were added a solution of 7.02 g (0.048 mol) triethylenetetramine (TETA) in 10 g petroleum ether at room temperature. 40 g (0.04 mol) polyisobutylene succinic anhydride was dissolved in 20 g petroleum ether (60-90° C.), and slowly added dropwise into the four-necked flask under the protection of nitrogen gas over 90 minutes. The mixture was stirred, and the reaction temperature was maintained at 110° C. After the completion of the dropwise addition, the mixture was warmed up to 180° C. and the reaction was maintained for 4 hours. Solvents were removed from the resulting reaction mixture to produce the detergent of Comparative Example 1, i.e. polyisobutylene-succimide based PIBSI-TETA, which had a structure represented by the following formula.

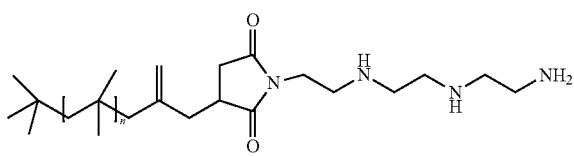

Example 2

The polymer of Example 2 was prepared from the reaction of a high active polyisobutylene succinic anhydride, 2-(2-(2-aminoethoxy)ethoxy)-N,N-dimethylethane-1-amine and propylene oxide. Among others, said 2-(2-(2-aminoethoxy)ethoxy)-N,N-dimethylethane-1-amine was prepared from 2-[2-(2-aminoethoxy)ethoxy]ethylamine (EDOBEA) and methanol through the amine methylation reaction known in the art.

To a four-necked flask equipped with a thermometer and a stirrer were added a solution of 0.048 mol 2-(2-(2-aminoethoxy)ethoxy)-N,N-dimethylethane-1-amine in 10 g petroleum ether under a nitrogen atmosphere. 40 g (0.04 mol) polyisobutylene succinic anhydride was dissolved in 20 g petroleum ether (60-90° C.), and slowly added dropwise into the four-necked flask under the protection of nitrogen gas over 90 minutes. After the completion of the dropwise addition, the mixture was warmed up to 40° C. and stirred for 30 minutes. 2.79 g (0.048 mol) propylene oxide was added to the four-necked flask. The mixture was warmed up to 70° C., and reacted under stirring for 7 hours. Solvents were removed from the resulting reaction mixture to produce the amine-based polymer of Example 2, i.e. propylene oxide-quaternary ammonium salt-amine-based polymer.

The illustrative reaction equation of Example 2 is as follows:

Example 3

To a four-necked flask equipped with a thermometer and a stirrer were added a solution of 0.048 mol 2-(2-(2-aminoethoxy)ethoxy)-N,N-dimethylethane-1-amine in 10 g petroleum ether under a nitrogen atmosphere. 40 g (0.04 mol) polyisobutylene succinic anhydride was dissolved in 20 g petroleum ether (60-90° C.), and slowly added dropwise into the four-necked flask under the protection of nitrogen gas over 90 minutes. After the completion of the dropwise addition, the mixture was warmed up to 40° C. and stirred for 30 minutes. Solvents were removed from the resulting reaction mixture to produce the amine-based polymer of Example 3.

The illustrative reaction equation of Example 3 is as follows:

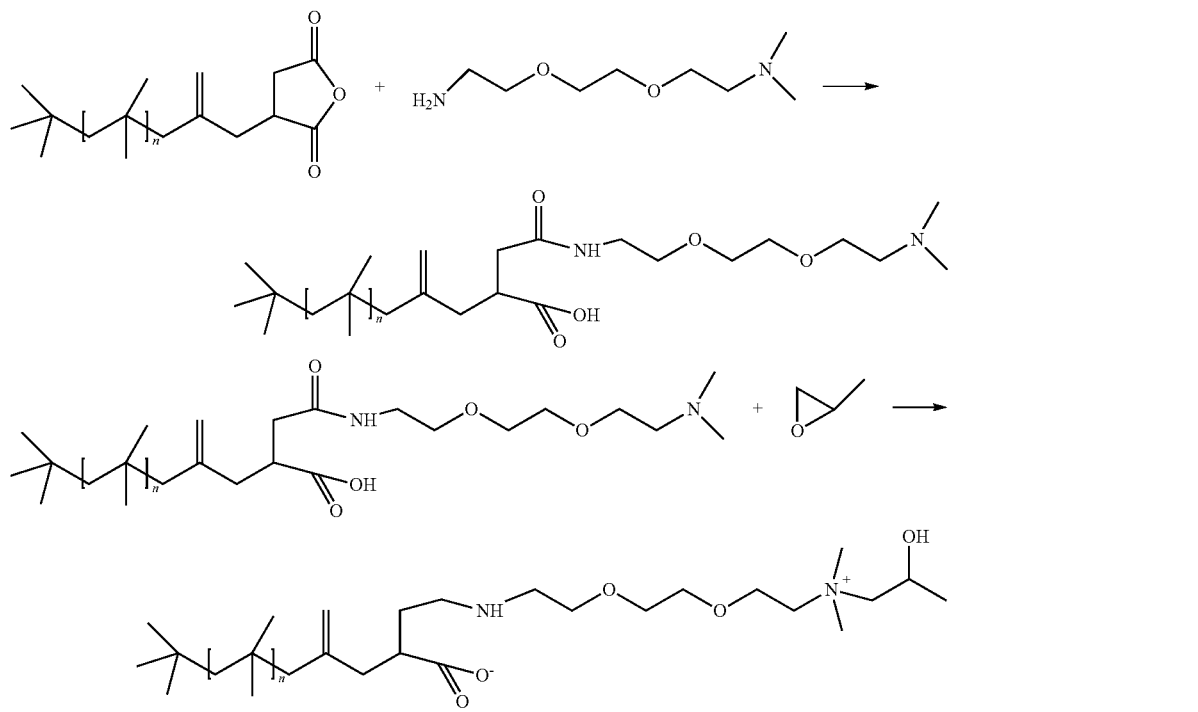

Example 4

To a four-necked flask equipped with a thermometer and a stirrer were added a solution of 0.048 mol 2-(2-(2-aminoethoxy)ethoxy)-N,N-dimethylethane-1-amine in 10 g petroleum ether under a nitrogen atmosphere. 40 g (0.04 mol) polyisobutylene succinic anhydride was dissolved in 20 g petroleum ether (60-90° C.), and slowly added dropwise into the four-necked flask under the protection of nitrogen gas over 90 minutes. After the completion of the dropwise addition, the mixture was warmed up to 40° C. and stirred for 30 minutes. 5.77 g (0.048 mol) styrene oxide was added to the four-necked flask. The mixture was warmed up to 70° C., and reacted under stirring for 7 hours. Solvents were removed from the resulting reaction mixture to produce the amine-based polymer of Example 4, i.e. styrene oxide-quaternary ammonium salt-amine-based polymer.

The illustrative reaction equation of Example 4 is as follows:

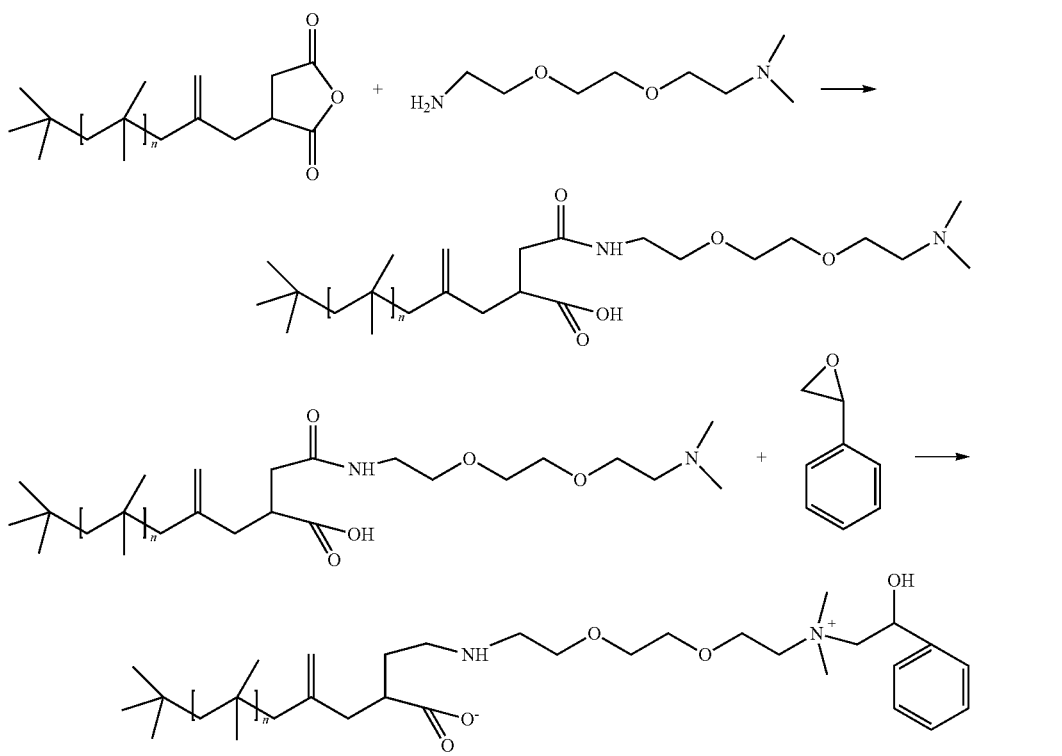

Example 5

To a four-necked flask equipped with a thermometer and a stirrer were added a solution of 0.048 mol N,N-dimethylpropanediamine in 10 g petroleum ether under a nitrogen atmosphere. 40 g (0.04 mol) polyisobutylene succinic anhydride was dissolved in 20 g petroleum ether (60-90° C.), and slowly added dropwise into the four-necked flask under the protection of nitrogen gas over 90 minutes. After the completion of the dropwise addition, the mixture was warmed up to 40° C. and stirred for 30 minutes. 5.77 g (0.048 mol) styrene oxide was added to the four-necked flask. The mixture was warmed up to 70° C., and reacted under stirring for 7 hours. Solvents were removed from the resulting reaction mixture to produce the amine-based polymer of Example 5.

The illustrative reaction equation of Example 5 is as follows:

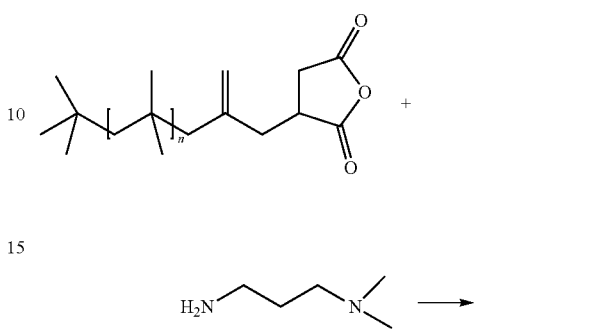

-continued

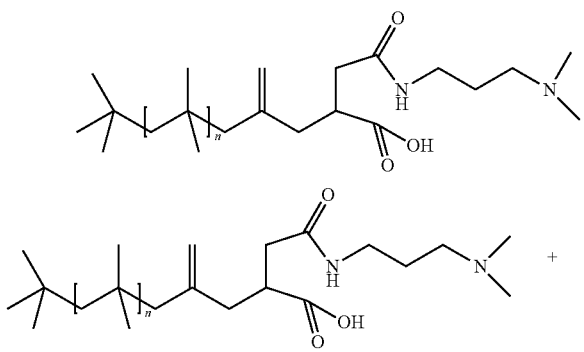

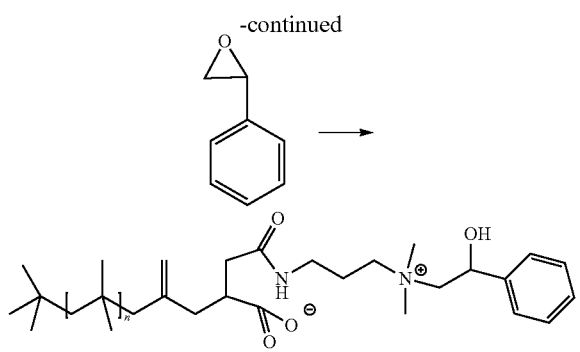

Example 6

To a four-necked flask equipped with a thermometer and a stirrer were added a solution of 0.048 mol N,N-dimethylpropanediamine in 10 g petroleum ether under a nitrogen atmosphere. 40 g (0.04 mol) polyisobutylene succinic anhydride was dissolved in 20 g petroleum ether (60-90° C.), and slowly added dropwise into the four-necked flask under the protection of nitrogen gas over 90 minutes. After the completion of the dropwise addition, the mixture was warmed up to 40° C. and stirred for 30 minutes. 2.79 g (0.048 mol) propylene oxide was added to the four-necked flask. The mixture was warmed up to 70° C., and reacted under stirring for 7 hours. Solvents were removed from the resulting reaction mixture to produce the amine-based polymer of Example 6.

The illustrative reaction equation of Example 6 is as follows:

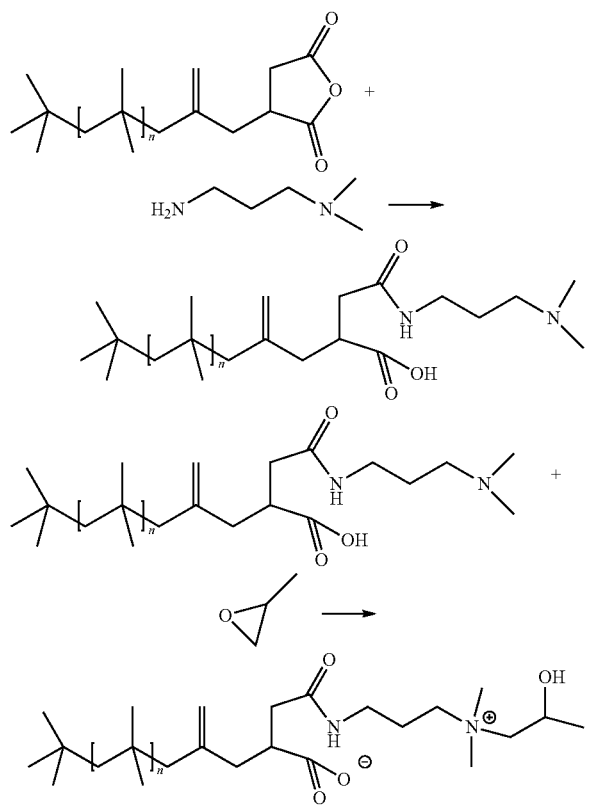

Detergency Simulation Experiment

The detergency performance of the polymers of the examples and the comparative example was evaluated by the L-3 type automobile diesel detergency simulation evaluation test machine of Lanzhou Weike Petrochemical Instrument Co., Ltd. The results were in good correlation with the diesel engine XUD-9 bench test.

The diesel compositions having a polymer content of 100 ppm were prepared by dissolving the polymers of the examples and the comparative example in diesel respectively. These diesel compositions were fed to the deposit collecting plate continuously and to-and-fro at a flow rate of 1.54 ml/min, and the deposit collecting plate temperature was 285° C. The deposit collecting plates were processed and weighed after the experiment. The smaller the weight gain of the deposit collecting plate was, the better the performance of the diesel detergent to suppress the formation of diesel deposits was. The weight gain data of the deposit collecting plate were shown in Table 1.

TABLE 1

| Detergency evaluation result | Weight gain of the deposit collecting plate/mg |
|---|---|
| Comparative Example (blank) | 11.5 |
| Example 1 | 8.42 |
| Comparative Example 1 | 10.0 |
| Example 2 | 6.41 |
| Example 3 | 8.72 |
| Example 4 | 6.85 |
| Example 5 | 8.43 |
| Example 6 | 7.87 |

From the above results, it was understood that the amine-based polymer of the present invention could more effectively reduce the formation of diesel deposits than the conventional polyisobutylene succinimide detergent. In particular, the amino-based polymer having an ether structural unit exhibited more excellent detergency performance.

Demulsification Experiment

The polymers of the examples and the comparative example were dissolved in diesel to prepare diesel compositions having a polymer content of 500 ppm. The demulsification properties of the amine-based polymers of the examples and the comparative example were evaluated by the method of Appendix B of GB/T 32859-2016 "Diesel Detergent", and the results were shown in Table 2.

TABLE 2

| Demulsification evaluation result | The amount of water separated in 15 minutes/mL |
|---|---|
| Comparative Example (blank) | 20 |
| Example 1 | 15 |
| Comparative Example 1 | 12 |
| Example 2 | 19 |
| Example 3 | 14 |
| Example 4 | 18 |
| Example 5 | 16 |
| Example 6 | 17 |

From the above results, it was understood that the amine-based polymer of the present invention had a better demulsification performance than the existing polyisobutylene succinimide diesel detergent.

INDUSTRIAL APPLICABILITY

The amine-based polymer of the present invention is useful as fuel detergent, and exhibits excellent demulsification performance and is excellent in dispersibility for fuel deposits, thereby exhibiting excellent detergency performance.

The invention claimed is:

1. An amine-based polymer, comprising a polymer main chain, and a structure represented by formula (I) attached onto the polymer main chain,
wherein said structure is attached to the polymer main chain via an attaching end present in at least one of Group G, Group G', and Group A in the structure,

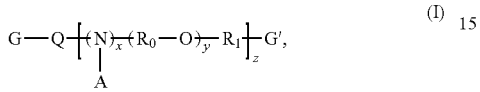

wherein Groups G and G' are each independently selected from

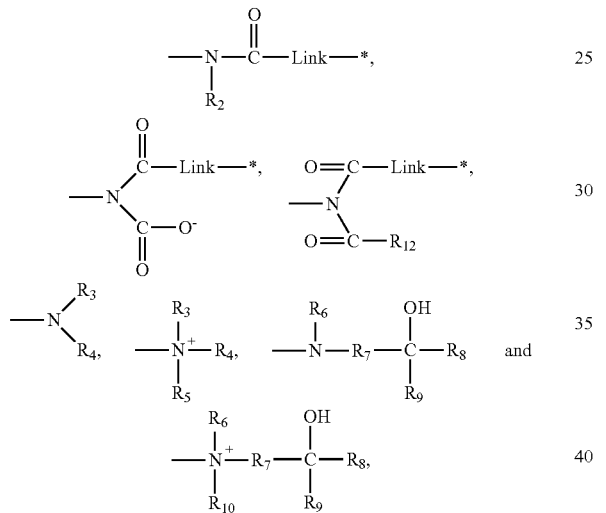

with the proviso that at least one of G and G' is selected from

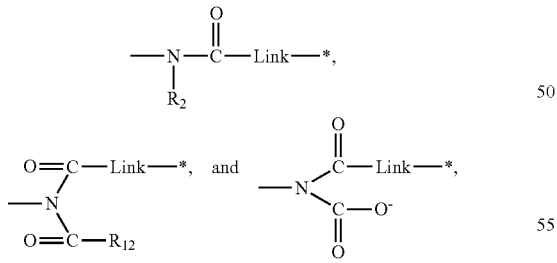

or with the proviso that both G and G' are

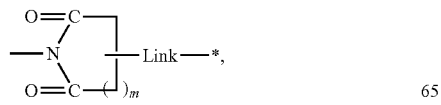

wherein each Group A present in formula (I) is independently selected from H, $R_{11}$,

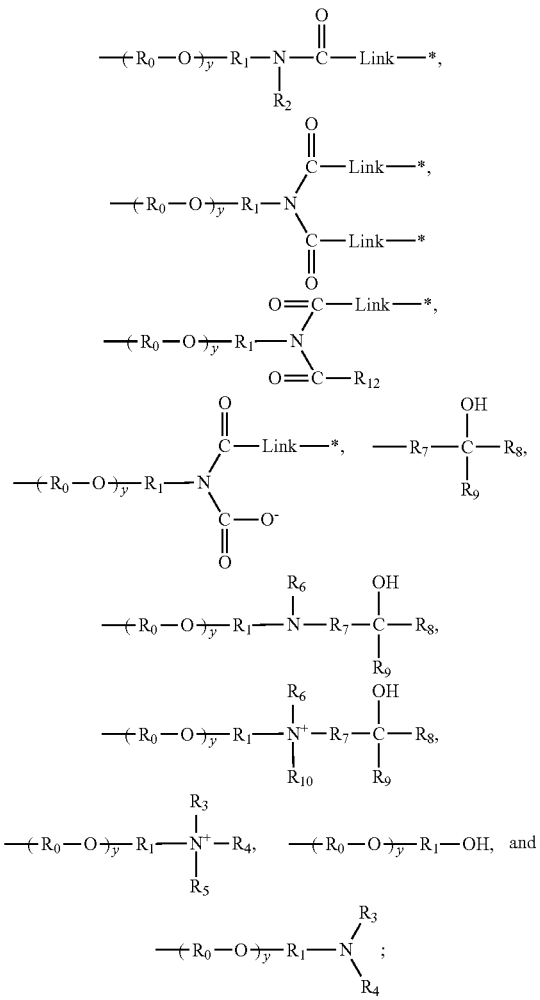

wherein the group Link represents a linking group selected from a single bond and $C_1$-$C_{10}$ linear or branched hydrocarbylene,
wherein * represents an attaching end for attaching to the polymer main chain,
wherein Q represents a single bond, $-(R_0-O)_y-R_1-$, or $C_1$-$C_{10}$ linear or branched hydrocarbylene,
wherein each x in formula (I) is 0; each y in formula (I) is independently an integer of 1-10 and z is 0 or an integer of 1-10, with the proviso that, when z is 0, Q does not represent a single bond, and
wherein each $R_0$ and each $R_1$ in formula (I) are independently selected from $C_1$-$C_{10}$ linear or branched alkylene; each $R_2$, each $R_3$, each $R_4$, each $R_5$ and each $R_6$ present in formula (I) are independently selected from H and $C_1$-$C_{10}$ linear or branched alkyl; each $R_7$ present in formula (I) is independently selected from $C_1$-$C_{10}$ linear or branched alkylene and $C_7$-$C_{16}$ aralkylene; each $R_8$ and each $R_9$ present in formula (I) are independently selected from H and $C_1$-$C_{10}$ linear or branched alkyl, $C_6$-$C_{16}$ aryl and $C_7$-$C_{16}$ alkylaryl; each $R_{10}$ and each $R_{11}$ present in formula (I) are independently selected from H and $C_1$-$C_{10}$ linear or branched alkyl; and each $R_{12}$ present in formula (I) is independently selected from OH and $C_1$-$C_{10}$ linear or branched alkyloxy.

2. The amine-based polymer according to claim 1, wherein z is an integer of 1-10 and Q is a single bond.

3. The amine-based polymer according to claim 1, wherein a sum of the total charge numbers of Group G, Group G', and Group A in formula (I) is 0.

4. The amine-based polymer according to claim 1, wherein, the polymer main chain of said amine-based polymer is at least one polymer selected from polyethylene, polypropylene, polybutylene, polyisobutylene, polypentene, polyhexylene, polyoctylene, polynonylene, and polydecylene.

5. The amine-based polymer according to claim 4, wherein the number-average molecular weight of the polymer main chain is 500-5000.

6. The amine-based polymer according to claim 1, wherein the polymer main chain of said amine-based polymer is attached via an attaching end present in any of Group G and Group G'.

7. The amine-based polymer according to claim 1, comprising a structure represented by formula (V),

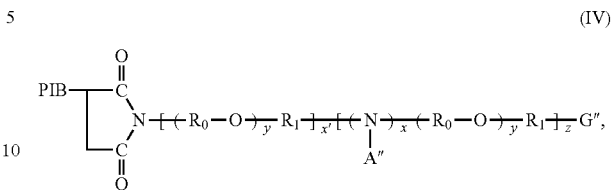

wherein A" is each independently selected from H, $-(R_0-O-)_y-R_1-H$, $-(R_0-O-)_y-R_1-NH_2$, and $-(R_0-O-)_y-R_1-OH$; z is an integer of 1-3; x' is 0, and PIB represents polyisobutene.

8. The amine-based polymer according to claim 1, comprising a structure represented by formula (VI),

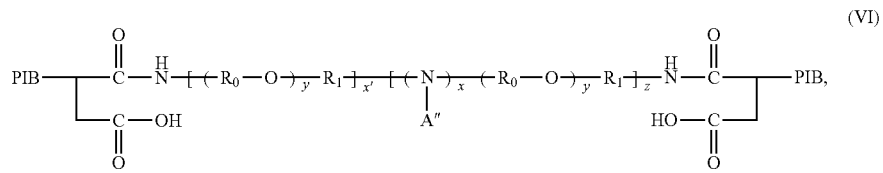

wherein A" is each independently selected from H, $-(R_0-O-)_y-R_1-H$, $-(R_0-O-)_y-R_1-NH_2$, and $-(R_0-O-)_y-R_1-OH$; z is an integer of 1-10; x' is 0 or 1, and PIB represents polyisobutene.

9. The amine-based polymer according to claim 1, comprising a structure represented by formula (VII),

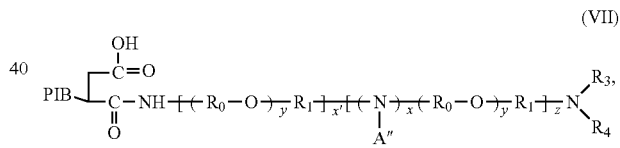

wherein A" is each independently selected from H,

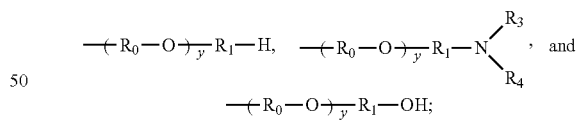

z is an integer of 1-10; x' is 0; and PIB represents polyisobutene.

10. The amine-based polymer according to claim 1, comprising a structure represented by formula (VIII),

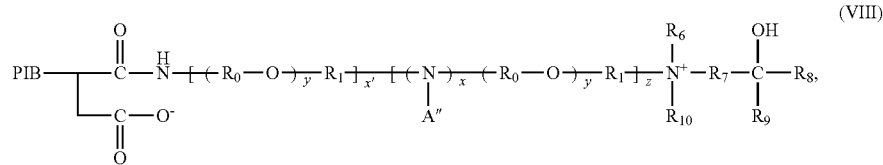

wherein A" is each independently selected from H,

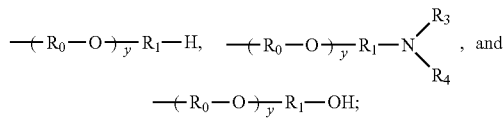

Z is an integer of 1-10; x' is 0; and PIB represents polyisobutene.

11. A composition comprising the amine-based polymer according to claim 1.

12. A method for producing a fuel composition, comprising adding the amine-based polymer according to claim 1 into a fuel.

13. A process for preparing the amine-based polymer according to claim 1, comprising an acylation reaction step of a polymer comprising a —$COR_{13}$ group and/or a

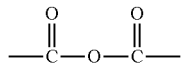

group attached onto the polymer main chain with a compound represented by formula (III)

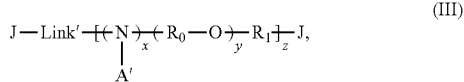

each x in the compound represented by formula (III) is 0; each y in the compound represented by formula (III) is each independently an integer of 1-10; z is 0 or an integer of 1-10; each J is each independently selected from OH, H,

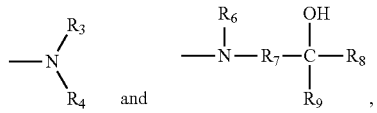

and among others at least one J is selected from

each A' in formula (III) is each independently selected from H, $R_{11}$,

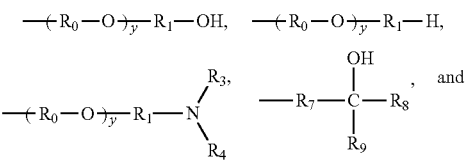

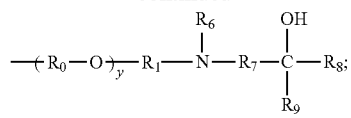

in the formula (III), each $R_0$ and each $R_1$ are each independently selected from $C_1$-$C_{10}$ linear or branched alkylene; each $R_3$, each $R_4$, each $R_6$ are each independently selected from H and $C_1$-$C_{10}$ linear or branched alkyl; each $R_7$ is each independently selected from $C_1$-$C_{10}$ linear or branched alkylene and $C_7$-$C_{16}$ aralkylene; each $R_8$ and each $R_9$ are each independently selected from H, $C_1$-$C_{10}$ linear or branched alkyl, $C_6$-$C_{16}$ aryl, and $C_7$-$C_{16}$ alkylaryl; each $R_{11}$ is each independently selected from H and $C_1$-$C_{10}$ linear or branched alkyl, $R_{13}$ is selected from OH, a halogen atom, $C_1$-$C_{10}$ linear or branched alkyloxy; the group Link' represents a linking group, and is selected from a single bond, $-(R_0-O-)_y R_1-$, and $C_1$-$C_{10}$ linear or branched hydrocarbylene, with the proviso that, when z is 0, the group Link' does not represent a single bond.

14. The process according to claim 13, wherein in formula (III), z is an integer of 1-10, in z repeating units, when x in the terminal repeating unit attached to J-Link' is 0, Link' is a single bond; when x in the terminal repeating unit attached to J-Link' is 1, Link' is $-(R_0-O-)_y R_1-$ or $C_1$-$C_{10}$ linear or branched hydrocarbylene, wherein when Link' is $-(R_0-O-)_y R_1-$, the attaching end at the $R_0$ side is attached to J, and the attaching end at the $R_1$ side is attached to the N atom of the terminal repeating unit

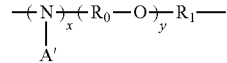

attached to J-Link' in z repeating units.

15. The process according to claim 13, wherein the compound represented by formula (III) is a compound represented by formula (III')

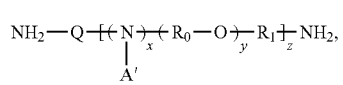 (III')

wherein A' is each independently selected from H, $R_{11}$,

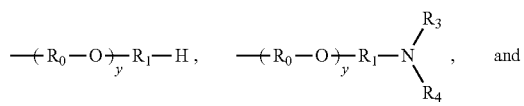

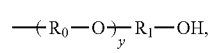

z is an integer of 1-10; in z repeating units, x in the terminal repeating unit attached to $NH_2$-Q- is 0, and Q is a single bond.

16. The process according to claim 13, wherein the reaction molar ratio of the polymer comprising the —COR$_{13}$ group and/or the

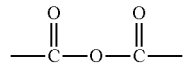

group attached onto the polymer main chain to the compound represented by formula (III) is 1:0.1-10.

17. The process according to claim 13, wherein the polymer comprising the —COR$_{13}$ group and/or the

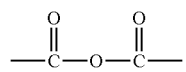

group attached onto the polymer main chain is a polymer containing q groups of —COR$_{13}$ and/or

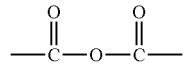

per the polymer molecule, wherein said q is the ratio of the total number of the —COR$_{13}$ group and the

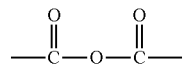

group in the polymer to the total number of the polymer molecule, wherein 1<q<10; the polymer main chain of said polymer containing q groups of —COR$_{13}$ and/or

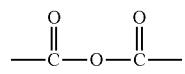

per the polymer molecule is at least one selected from polyolefin, polyether, and polyester.

18. The process according to claim 13, wherein the polymer main chain of polymer comprising the —COR$_{13}$ group and/or the

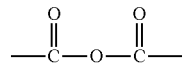

group attached onto the polymer main chain has a number-average molecular weight of 500-5000.

* * * * *